(12) United States Patent
Chin et al.

(10) Patent No.: US 9,203,690 B2
(45) Date of Patent: Dec. 1, 2015

(54) ROLE BASED MULTICAST MESSAGING INFRASTRUCTURE

(71) Applicant: Brocade Communications Systems, Inc., San Jose, CA (US)

(72) Inventors: Bill Ying Chin, San Jose, CA (US); Dan N. Retter, Cupertino, CA (US); Mayur Mahajan, San Francisco, CA (US); Poongovan Ponnavaikko, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 152 days.

(21) Appl. No.: 13/827,641

(22) Filed: Mar. 14, 2013

(65) Prior Publication Data
US 2014/0089484 A1 Mar. 27, 2014

Related U.S. Application Data

(60) Provisional application No. 61/704,930, filed on Sep. 24, 2012.

(51) Int. Cl.
*G06F 15/173* (2006.01)
*H04L 12/24* (2006.01)
*H04L 12/58* (2006.01)
*H04L 12/801* (2013.01)
*H04L 12/761* (2013.01)
*H04L 12/773* (2013.01)

(52) U.S. Cl.
CPC ............. *H04L 41/00* (2013.01); *H04L 47/15* (2013.01); *H04L 51/28* (2013.01); *H04L 45/16* (2013.01); *H04L 45/60* (2013.01)

(58) Field of Classification Search
None
See application file for complete search history.

(56) References Cited

U.S. PATENT DOCUMENTS

| | | |
|---|---|---|
| 5,159,592 A | 10/1992 | Perkins |
| 5,278,986 A | 1/1994 | Jourdenais et al. |
| 5,410,710 A | 4/1995 | Sarangdhar et al. |
| 5,550,816 A | 8/1996 | Hardwick et al. |
| 5,649,110 A | 7/1997 | Ben-Nun et al. |
| 5,701,502 A | 12/1997 | Baker et al. |
| 5,732,209 A | 3/1998 | Vigil et al. |
| 5,828,578 A | 10/1998 | Blomgren |

(Continued)

FOREIGN PATENT DOCUMENTS

| | | |
|---|---|---|
| EP | 0887731 A1 | 12/1998 |
| EP | 0926859 A | 6/1999 |

(Continued)

OTHER PUBLICATIONS

U.S. Appl. No. 14/514,253 filed by Zhou et al. on Oct. 14, 2014, (Unpublished).

(Continued)

*Primary Examiner* — John B Walsh
(74) *Attorney, Agent, or Firm* — Kilpatrick Townsend & Stockton LLP

(57) ABSTRACT

Certain embodiments of the present invention provide techniques that enable messages to be sent to a processing entity within a computing device without knowing the network address of the processing entity. In certain embodiments, instead of using the network address of the processing entity, a message can be communicated to the processing entity using information indicative of a role or state or function performed by the processing entity.

16 Claims, 17 Drawing Sheets

(56) References Cited

U.S. PATENT DOCUMENTS

| | | | |
|---|---|---|---|
| 5,878,232 A | 3/1999 | Marimuthu |
| 5,878,264 A | 3/1999 | Ebrahim |
| 5,970,232 A | 10/1999 | Passint et al. |
| 5,978,578 A | 11/1999 | Azarya et al. |
| 6,047,330 A | 4/2000 | Stracke, Jr. |
| 6,097,718 A | 8/2000 | Bion |
| 6,101,188 A | 8/2000 | Sekine et al. |
| 6,104,700 A | 8/2000 | Haddock et al. |
| 6,111,888 A | 8/2000 | Green et al. |
| 6,115,393 A | 9/2000 | Engel et al. |
| 6,119,200 A | 9/2000 | George |
| 6,161,169 A | 12/2000 | Cheng |
| 6,233,236 B1 | 5/2001 | Nelson et al. |
| 6,269,391 B1 | 7/2001 | Gillespie |
| 6,282,678 B1 | 8/2001 | Snay et al. |
| 6,331,983 B1 | 12/2001 | Haggerty et al. |
| 6,374,292 B1 | 4/2002 | Srivastava et al. |
| 6,397,242 B1 | 5/2002 | Devine et al. |
| 6,424,629 B1 | 7/2002 | Rubino et al. |
| 6,430,609 B1 | 8/2002 | Dewhurst et al. |
| 6,442,682 B1 | 8/2002 | Pothapragada et al. |
| 6,496,510 B1 | 12/2002 | Tsukakoshi et al. |
| 6,496,847 B1 | 12/2002 | Bugnion et al. |
| 6,526,054 B1 | 2/2003 | Li et al. |
| 6,567,417 B2 | 5/2003 | Kalkunte et al. |
| 6,570,875 B1 | 5/2003 | Hegde |
| 6,577,634 B1 | 6/2003 | Tsukakoshi et al. |
| 6,580,727 B1 | 6/2003 | Yim et al. |
| 6,587,469 B1 | 7/2003 | Bragg |
| 6,597,699 B1 | 7/2003 | Ayres |
| 6,604,146 B1 | 8/2003 | Rempe et al. |
| 6,608,819 B1 | 8/2003 | Mitchem et al. |
| 6,633,916 B2 | 10/2003 | Kauffman |
| 6,636,895 B1 | 10/2003 | Li et al. |
| 6,674,756 B1 | 1/2004 | Rao et al. |
| 6,675,218 B1 | 1/2004 | Mahler et al. |
| 6,678,248 B1 | 1/2004 | Haddock et al. |
| 6,680,904 B1 | 1/2004 | Kaplan et al. |
| 6,683,850 B1 * | 1/2004 | Dunning et al. ............... 370/231 |
| 6,691,146 B1 | 2/2004 | Armstrong et al. |
| 6,704,925 B1 | 3/2004 | Bugnion |
| 6,711,357 B1 | 3/2004 | Brewer et al. |
| 6,711,672 B1 | 3/2004 | Agesen |
| 6,725,289 B1 | 4/2004 | Waldspurger et al. |
| 6,731,601 B1 | 5/2004 | Krishna et al. |
| 6,732,220 B2 | 5/2004 | Babaian et al. |
| 6,763,023 B1 | 7/2004 | Gleeson et al. |
| 6,785,886 B1 | 8/2004 | Lim et al. |
| 6,789,156 B1 | 9/2004 | Waldspurger |
| 6,791,980 B1 | 9/2004 | Li |
| 6,795,966 B1 | 9/2004 | Lim et al. |
| 6,847,638 B1 | 1/2005 | Wu |
| 6,854,054 B1 | 2/2005 | Kavanagh |
| 6,859,438 B2 | 2/2005 | Haddock et al. |
| 6,879,559 B1 | 4/2005 | Blackmon et al. |
| 6,880,022 B1 | 4/2005 | Waldspurger et al. |
| 6,894,970 B1 | 5/2005 | McDermott, III et al. |
| 6,898,189 B1 | 5/2005 | Di Benedetto et al. |
| 6,910,148 B1 | 6/2005 | Ho et al. |
| 6,938,179 B2 | 8/2005 | Iyer et al. |
| 6,944,699 B1 | 9/2005 | Bugnion et al. |
| 6,961,806 B1 | 11/2005 | Agesen et al. |
| 6,961,941 B1 | 11/2005 | Nelson et al. |
| 6,975,587 B1 | 12/2005 | Adamski et al. |
| 6,975,639 B1 | 12/2005 | Hill et al. |
| 7,039,720 B2 | 5/2006 | Alfieri et al. |
| 7,058,010 B2 | 6/2006 | Chidambaran et al. |
| 7,061,858 B1 | 6/2006 | Di Benedetto et al. |
| 7,065,059 B1 | 6/2006 | Zinin |
| 7,065,079 B1 | 6/2006 | Patra et al. |
| 7,080,283 B1 | 7/2006 | Songer et al. |
| 7,093,160 B2 | 8/2006 | Lau et al. |
| 7,133,399 B1 | 11/2006 | Brewer et al. |
| 7,188,237 B2 | 3/2007 | Zhou et al. |
| 7,194,652 B2 | 3/2007 | Zhou et al. |
| 7,236,453 B2 | 6/2007 | Visser et al. |
| 7,269,133 B2 | 9/2007 | Lu et al. |
| 7,284,236 B2 | 10/2007 | Zhou et al. |
| 7,292,535 B2 | 11/2007 | Folkes et al. |
| 7,305,492 B2 | 12/2007 | Bryers et al. |
| 7,308,503 B2 | 12/2007 | Giraud et al. |
| 7,315,552 B2 | 1/2008 | Kalkunte et al. |
| 7,317,722 B2 | 1/2008 | Aquino et al. |
| 7,324,500 B1 | 1/2008 | Blackmon et al. |
| 7,327,671 B2 | 2/2008 | Karino et al. |
| 7,339,903 B2 | 3/2008 | O'Neill |
| 7,360,084 B1 | 4/2008 | Hardjono |
| 7,362,700 B2 | 4/2008 | Frick et al. |
| 7,382,736 B2 | 6/2008 | Mitchem et al. |
| 7,385,977 B2 | 6/2008 | Wu et al. |
| 7,392,424 B2 | 6/2008 | Ho et al. |
| 7,404,006 B1 * | 7/2008 | Slaughter et al. ............... 709/238 |
| 7,406,037 B2 | 7/2008 | Okita |
| 7,417,947 B1 | 8/2008 | Marques et al. |
| 7,417,990 B2 | 8/2008 | Ikeda et al. |
| 7,418,439 B2 | 8/2008 | Wong |
| 7,424,014 B2 | 9/2008 | Mattes et al. |
| 7,441,017 B2 | 10/2008 | Watson et al. |
| 7,444,422 B1 | 10/2008 | Li |
| 7,447,225 B2 | 11/2008 | Windisch et al. |
| 7,483,370 B1 | 1/2009 | Dayal et al. |
| 7,483,433 B2 | 1/2009 | Simmons et al. |
| 7,503,039 B2 | 3/2009 | Inoue et al. |
| 7,518,986 B1 | 4/2009 | Chadalavada et al. |
| 7,522,521 B2 | 4/2009 | Bettink et al. |
| 7,533,254 B2 | 5/2009 | Dybsetter et al. |
| 7,535,826 B1 | 5/2009 | Cole et al. |
| 7,599,284 B1 | 10/2009 | Di Benedetto et al. |
| 7,609,617 B2 | 10/2009 | Appanna et al. |
| 7,613,183 B1 | 11/2009 | Brewer et al. |
| 7,620,953 B1 | 11/2009 | Tene et al. |
| 7,652,982 B1 | 1/2010 | Kovummal |
| 7,656,409 B2 | 2/2010 | Cool et al. |
| 7,664,020 B2 | 2/2010 | Luss |
| 7,694,298 B2 | 4/2010 | Goud et al. |
| 7,720,066 B2 | 5/2010 | Weyman et al. |
| 7,729,296 B1 | 6/2010 | Choudhary |
| 7,739,360 B2 | 6/2010 | Watson et al. |
| 7,751,311 B2 | 7/2010 | Ramaiah et al. |
| 7,787,360 B2 | 8/2010 | Windisch et al. |
| 7,787,365 B1 | 8/2010 | Marques et al. |
| 7,788,381 B2 | 8/2010 | Watson et al. |
| 7,802,073 B1 | 9/2010 | Cheng et al. |
| 7,804,769 B1 | 9/2010 | Tuplur et al. |
| 7,804,770 B2 | 9/2010 | Ng |
| 7,805,516 B2 | 9/2010 | Kettler et al. |
| 7,830,802 B2 | 11/2010 | Huang et al. |
| 7,830,895 B2 | 11/2010 | Endo et al. |
| 7,843,920 B2 | 11/2010 | Karino et al. |
| 7,843,930 B2 | 11/2010 | Mattes et al. |
| 7,873,776 B2 | 1/2011 | Hetherington et al. |
| 7,886,195 B2 | 2/2011 | Mayer |
| 7,894,334 B2 | 2/2011 | Wen et al. |
| 7,929,424 B2 | 4/2011 | Kochhar et al. |
| 7,940,650 B1 | 5/2011 | Sandhir et al. |
| 7,944,811 B2 | 5/2011 | Windisch et al. |
| 7,974,315 B2 | 7/2011 | Yan et al. |
| 8,009,671 B2 | 8/2011 | Guo et al. |
| 8,014,394 B2 | 9/2011 | Ram |
| 8,028,290 B2 | 9/2011 | Rymarczyk et al. |
| 8,040,884 B2 | 10/2011 | Arunachalam et al. |
| 8,074,110 B2 | 12/2011 | Vera et al. |
| 8,086,906 B2 | 12/2011 | Ritz et al. |
| 8,089,964 B2 | 1/2012 | Lo et al. |
| 8,095,691 B2 | 1/2012 | Verdoorn, Jr. et al. |
| 8,099,625 B1 | 1/2012 | Tseng et al. |
| 8,102,848 B1 | 1/2012 | Rao |
| 8,121,025 B2 | 2/2012 | Duan et al. |
| 8,131,833 B2 | 3/2012 | Hadas et al. |
| 8,149,691 B1 | 4/2012 | Chadalavada et al. |
| 8,156,230 B2 | 4/2012 | Bakke et al. |
| 8,161,260 B2 | 4/2012 | Srinivasan |
| 8,180,923 B2 | 5/2012 | Smith et al. |
| 8,181,174 B2 | 5/2012 | Liu |

(56) References Cited

U.S. PATENT DOCUMENTS

| | | | |
|---|---|---|---|
| 8,291,430 B2 | 10/2012 | Anand et al. | |
| 8,335,219 B2 | 12/2012 | Simmons et al. | |
| 8,341,625 B2 | 12/2012 | Ferris et al. | |
| 8,345,536 B1 | 1/2013 | Rao et al. | |
| 8,406,125 B2 | 3/2013 | Dholakia et al. | |
| 8,495,418 B2 | 7/2013 | Abraham et al. | |
| 8,503,289 B2 | 8/2013 | Dholakia et al. | |
| 8,576,703 B2 | 11/2013 | Dholakia et al. | |
| 8,607,110 B1 | 12/2013 | Peng et al. | |
| 8,769,155 B2 | 7/2014 | Nagappan et al. | |
| 8,776,050 B2 | 7/2014 | Plouffe et al. | |
| 2002/0013802 A1 | 1/2002 | Mori et al. | |
| 2002/0035641 A1 | 3/2002 | Kurose et al. | |
| 2002/0103921 A1 | 8/2002 | Nair et al. | |
| 2002/0129166 A1 | 9/2002 | Baxter et al. | |
| 2002/0150094 A1 | 10/2002 | Cheng et al. | |
| 2003/0084161 A1 | 5/2003 | Watson et al. | |
| 2003/0105794 A1 | 6/2003 | Jasinschi et al. | |
| 2003/0202520 A1 | 10/2003 | Witkowski et al. | |
| 2004/0001485 A1 | 1/2004 | Frick et al. | |
| 2004/0030766 A1 | 2/2004 | Witkowski | |
| 2004/0078625 A1 | 4/2004 | Rampuria et al. | |
| 2005/0028028 A1 | 2/2005 | Jibbe | |
| 2005/0036485 A1 | 2/2005 | Eilers et al. | |
| 2005/0055598 A1 | 3/2005 | Chen et al. | |
| 2005/0114846 A1 | 5/2005 | Banks et al. | |
| 2005/0149633 A1* | 7/2005 | Natarajan et al. | 709/238 |
| 2005/0213498 A1 | 9/2005 | Appanna et al. | |
| 2006/0002343 A1 | 1/2006 | Nain et al. | |
| 2006/0004942 A1 | 1/2006 | Hetherington et al. | |
| 2006/0018253 A1 | 1/2006 | Windisch et al. | |
| 2006/0018333 A1 | 1/2006 | Windisch et al. | |
| 2006/0090136 A1 | 4/2006 | Miller et al. | |
| 2006/0143617 A1 | 6/2006 | Knauerhase et al. | |
| 2006/0171404 A1 | 8/2006 | Nalawade et al. | |
| 2006/0176804 A1 | 8/2006 | Shibata | |
| 2006/0184349 A1 | 8/2006 | Goud et al. | |
| 2006/0184938 A1 | 8/2006 | Mangold | |
| 2006/0224826 A1 | 10/2006 | Arai et al. | |
| 2006/0274649 A1 | 12/2006 | Scholl | |
| 2006/0294211 A1 | 12/2006 | Amato | |
| 2007/0027976 A1 | 2/2007 | Sasame et al. | |
| 2007/0036178 A1 | 2/2007 | Hares et al. | |
| 2007/0076594 A1 | 4/2007 | Khan et al. | |
| 2007/0162565 A1 | 7/2007 | Hanselmann | |
| 2007/0169084 A1 | 7/2007 | Frank et al. | |
| 2007/0174309 A1 | 7/2007 | Pettovello | |
| 2007/0189213 A1 | 8/2007 | Karino et al. | |
| 2008/0022410 A1 | 1/2008 | Diehl | |
| 2008/0068986 A1 | 3/2008 | Maranhao et al. | |
| 2008/0082810 A1 | 4/2008 | Cepulis et al. | |
| 2008/0120518 A1 | 5/2008 | Ritz et al. | |
| 2008/0159325 A1 | 7/2008 | Chen et al. | |
| 2008/0165681 A1 | 7/2008 | Huang et al. | |
| 2008/0165750 A1 | 7/2008 | Kim | |
| 2008/0189468 A1 | 8/2008 | Schmidt et al. | |
| 2008/0201603 A1 | 8/2008 | Ritz et al. | |
| 2008/0212584 A1 | 9/2008 | Breslau et al. | |
| 2008/0222633 A1 | 9/2008 | Kami | |
| 2008/0225859 A1 | 9/2008 | Mitchem | |
| 2008/0243773 A1 | 10/2008 | Patel et al. | |
| 2008/0244222 A1 | 10/2008 | Supalov et al. | |
| 2008/0250266 A1 | 10/2008 | Desai et al. | |
| 2009/0028044 A1 | 1/2009 | Windisch et al. | |
| 2009/0031166 A1 | 1/2009 | Kathail et al. | |
| 2009/0036152 A1 | 2/2009 | Janneteau et al. | |
| 2009/0037585 A1 | 2/2009 | Miloushev et al. | |
| 2009/0049537 A1 | 2/2009 | Chen et al. | |
| 2009/0051492 A1 | 2/2009 | Diaz et al. | |
| 2009/0054045 A1 | 2/2009 | Zakrzewski et al. | |
| 2009/0080428 A1 | 3/2009 | Witkowski et al. | |
| 2009/0086622 A1 | 4/2009 | Ng | |
| 2009/0092135 A1 | 4/2009 | Simmons et al. | |
| 2009/0094481 A1 | 4/2009 | Vera et al. | |
| 2009/0106409 A1 | 4/2009 | Murata | |
| 2009/0185506 A1 | 7/2009 | Watson et al. | |
| 2009/0198766 A1 | 8/2009 | Chen et al. | |
| 2009/0216863 A1 | 8/2009 | Gebhart et al. | |
| 2009/0219807 A1 | 9/2009 | Wang | |
| 2009/0245248 A1 | 10/2009 | Arberg et al. | |
| 2009/0316573 A1 | 12/2009 | Lai | |
| 2010/0017643 A1 | 1/2010 | Baba et al. | |
| 2010/0039932 A1 | 2/2010 | Wen et al. | |
| 2010/0058342 A1 | 3/2010 | Machida | |
| 2010/0064293 A1 | 3/2010 | Kang et al. | |
| 2010/0107162 A1 | 4/2010 | Edwards et al. | |
| 2010/0138208 A1 | 6/2010 | Hattori et al. | |
| 2010/0138830 A1 | 6/2010 | Astete et al. | |
| 2010/0169253 A1 | 7/2010 | Tan | |
| 2010/0235662 A1 | 9/2010 | Nishtala | |
| 2010/0257269 A1 | 10/2010 | Clark | |
| 2010/0278091 A1 | 11/2010 | Sung et al. | |
| 2010/0287548 A1 | 11/2010 | Zhou et al. | |
| 2010/0325381 A1 | 12/2010 | Heim | |
| 2010/0325485 A1 | 12/2010 | Kamath et al. | |
| 2011/0010709 A1 | 1/2011 | Anand et al. | |
| 2011/0023028 A1 | 1/2011 | Nandagopal et al. | |
| 2011/0072327 A1 | 3/2011 | Schoppmeier et al. | |
| 2011/0125949 A1 | 5/2011 | Mudigonda et al. | |
| 2011/0126196 A1 | 5/2011 | Cheung et al. | |
| 2011/0154331 A1 | 6/2011 | Ciano et al. | |
| 2011/0173334 A1* | 7/2011 | Shah | 709/228 |
| 2011/0228770 A1 | 9/2011 | Dholakia et al. | |
| 2011/0228771 A1 | 9/2011 | Dholakia et al. | |
| 2011/0228772 A1 | 9/2011 | Dholakia et al. | |
| 2011/0228773 A1 | 9/2011 | Dholakia et al. | |
| 2011/0231578 A1 | 9/2011 | Nagappan et al. | |
| 2012/0023309 A1 | 1/2012 | Abraham et al. | |
| 2012/0023319 A1 | 1/2012 | Chin et al. | |
| 2012/0030237 A1 | 2/2012 | Tanaka | |
| 2012/0158995 A1 | 6/2012 | McNamee et al. | |
| 2012/0174097 A1 | 7/2012 | Levin | |
| 2012/0230240 A1 | 9/2012 | Nebat et al. | |
| 2012/0290869 A1 | 11/2012 | Heitz | |
| 2013/0070766 A1 | 3/2013 | Pudiyapura | |
| 2013/0211552 A1 | 8/2013 | Gomez et al. | |
| 2013/0259039 A1 | 10/2013 | Dholakia et al. | |
| 2014/0007097 A1 | 1/2014 | Chin et al. | |
| 2014/0029613 A1 | 1/2014 | Dholakia et al. | |
| 2014/0036915 A1 | 2/2014 | Dholakia et al. | |
| 2014/0068103 A1 | 3/2014 | Gyambavantha et al. | |
| 2014/0089425 A1 | 3/2014 | Chin et al. | |
| 2014/0089484 A1 | 3/2014 | Chin et al. | |
| 2014/0095927 A1 | 4/2014 | Abraham et al. | |

FOREIGN PATENT DOCUMENTS

| | | |
|---|---|---|
| EP | 1107511 A2 | 6/2001 |
| EP | 1 939 742 A2 | 2/2008 |
| EP | 2 084 605 A2 | 8/2009 |
| WO | 2008/54997 A2 | 5/2008 |
| WO | 2014/004312 A1 | 1/2014 |

OTHER PUBLICATIONS

"GIGAswitch FDDI System—Manager's Guide," Part No. EK-GGMGA-MG.B01, Jun. 1993 first printing, Apr. 1995 second printing, Copyright 1995, 113 pages, Digital Equipment Corporation, Maynard, MA.

"GIGAswitch System—Manager's Guide," Part No. EK-GGMGA-MG.A01, Jun. 1993, Copyright 1993, 237 pages, Digital Equipment Corporation, Maynard, MA.

Braden et al., "Integrated Services in the Internet Architecture: an Overview," Jul. 1994, RFC 1633, Network Working Group, pp. 1-28.

Burke, "Vmware Counters Oracle, Microsoft With Free Update", Nov. 13, 2007, 2 pages.

Chen, "New Paradigm in Application Delivery Networking: Advanced Core Operating System (ACOS) and Multi-CPU Architecture—They Key to Achieving Availability, Scalability and Preformance." White Paper, May 2009, 5 pages, A10 Networks.

Cisco Systems, Inc., "BGP Support for Nonstop Routing (NSR) with Stateful Switchover (SSO)." Mar. 20, 2006, 18 pages.

(56) References Cited

OTHER PUBLICATIONS

European Search Report for Application No. EP 02254403, dated Mar. 18, 2003, 3 pages.
European Search Report for Application No. EP 02256444, dated Feb. 23, 2005, 3 pages.
*Extreme v. Enterasys* WI Legal Transcript of Stephen R. Haddock, May 7, 2008, vol. 2, 2 pages.
Fenner, et al., "Protocol Independent Multicast—Sparse Mode (PIM-SM): Protocol Specification (Revised)." Network Working Group, RFC 4601, Aug. 2006, pp. 1-151.
Floyd et al., "Link-sharing and Resource Management Models for Packet Networks," IEEE/ACM Transactions on Networking, Aug. 1995, vol. 3, No. 4, Copyright 1995, IEEE, 22 pages.
Freescale Semiconductor, Inc., "Freescale's Embedded Hypervisor for QorIQ™ P4 Series Communications Platform," White Paper, Oct. 2008, Copyright 2008, 8 pages, Document No. EMHYPQIQTP4CPWP, Rev. 1.
Freescale Semiconductor, Inc., "Embedded Multicore: An Introduction," Jul. 2009, Copyright 2009, 73 pages, Document No. EMBMCRM, Rev. 0.
Hardwick, "IP Multicast Explained," Metaswitch Networks, Jun. 2004, 71 pages.
Hemminger, "Delivering Advanced Application Acceleration & Security," Application Delivery Challenge, Jul. 2007, 3 pages.
IP Infusion Brochure, "ZebOS® Network Platform: Transporting You to Next Generation Networks," ip infusion™ An ACCESS Company, Jun. 2008, 6 pages.
Kaashok et al., "An Efficient Reliable Broadcast Protocol," Operating System Review, Oct. 4, 1989, 15 pages.
Kakadia, et al., "Enterprise Network Design Patterns: High Availability" Sun Microsystems, Inc., Sun BluePrints™ Online, Revision A, Nov. 26, 2003, 37 pages, at URL: http://www.sun.com/blueprints.
Keshav, "An Engineering Approach to Computer Networking: ATM Networks; the internet, and the Telephone Network," Addison-Wesley Professional Computing Series, part 1 of 5, May 15, 1997, Copyright 1997, 148 pages, by At&T, Addison-Wesley Publishing Company.
Keshav, "An Engineering Approach to Computer Networking: ATM Networks; the internet, and the Telephone Network," Addison-Wesley Professional Computing Series, part 2 of 5, May 15, 1997, Copyright 1997, 131 pages, by AT&T, Addison-Wesley Publishing Company.
Keshav, "An Engineering Approach to Computer Networking: ATM Networks; the internet, and the Telephone Network," Addison-Wesley Professional Computing Series, part 3 of 5, May 15, 1997, Copyright 1997, 129 pages, by AT&T, Addison-Wesley Publishing Company.
Keshav, "An Engineering Approach to Computer Networking: ATM Networks; the internet, and the Telephone Network," Addison-Wesley Professional Computing Series, part 4 of 5, May 15, 1997, Copyright 1997, 130 pages, by AT&T, Addison-Wesley Publishing Company.
Keshav, "An Engineering Approach to Computer Networking: ATM Networks; the internet, and the Telephone Network," Addison-Wesley Professional Computing Series, part 5 of 5, May 15, 1997, Copyright 1997, 142 pages, by AT&T, Addison-Wesley Publishing Company.
Khan, "IP Routing Use Cases," Cisco Press, Sep. 22, 2009, pp. 1-16, at URL: http://www.ciscopress.com/articles/printerfriendly.asp?p=1395746.
Manolov, et al., "An Investigation into Multicasting, Proceedings of the 14th Annual Workshop on Architecture and System Design," (ProRISC2003), Veldhoven, The Netherlands, Nov. 2003, 6 pages.
Moy, "OSPF Version 2," Network Working Group, RFC 2328, Apr. 1998, 204 pages.
Order Granting/Denying Request for Ex Parte Reexamination for U.S. Appl. No. 90/010,432, mailed on May 21, 2009, 18 pages.
Order Granting/Denying Request for Ex Parte Reexamination for U.S. Appl. No. 90/010,433, mailed on May 22, 2009, 15 pages.
Order Granting/Denying Request for Ex Parte Reexamination for U.S. Appl. No. 90/010,434, mailed on May 22, 2009, 20 pages.
Pangal, "Core Based Virtualization—Secure, Elastic and Deterministic Computing is Here . . . ," Blog Posting, May 26, 2009, 1 page, printed on Jul. 13, 2009, at URL: http://community.brocade.com/home/community/brocadeblogs/wingspan/blog/tags/serveri. . . .
Partridge, "A Proposed Flow Specification," RFC 1363, Sep. 1992, pp. 1-20, Network Working Group.
Pepelnjak, et al., "Using Multicast Domains," informIT, Jun. 27, 2003, pp. 1-29, at URL: http://www.informit.com/articles/printerfriendly.aspx?p=32100.
Product Category Brochure, "J Series, M Series and MX Series Routers—Juniper Networks Enterprise Routers—New Levels of Performance, Availability, Advanced Routing Features, and Operations Agility for Today's High-Performance Businesses," Juniper Networks, Nov. 2009, 11 pages.
Quickspecs, "HP Online VM Migration (for HP Integrity Virtual Machines)", Wordwide—Version 4, Sep. 27, 2010, 4 pages.
Riggsbee, "From ADC to Web Security, Serving the Online Community," Blog Posting, Jul. 8, 2009, 2 pages, printed on Dec. 22, 2009, at URL: http://community.brocade.com/home/community/brocadeblogs/wingspan/blog/2009/07/0. . . .
Riggsbee, "You've Been Warned, the Revolution Will Not Be Televised," Blog Posting, Jul. 9, 2009, 2 pages, printed on Dec. 22, 2009, at URL: http://community.brocade.com/home/community/brocadeblogs/wingspan/blog/2009/07/0. . . .
Rodbell, "Protocol Independent Multicast—Sparse Mode," CommsDesign, Dec. 19, 2009, pp. 1-5, at URL: http://www.commsdesign.com/main/9811/9811standards.htm.
Schlansker, et al., "High-Performance Ethernet-Based Communications for Future Multi-Core Processors," SC07 Nov. 10-16, 2007, Copyright 2007, 12 pages, ACM.
Wolf, et al., "Design Issues for High-Performance Active Routers," IEEE Journal on Selected Areas in Communications, IEEE, Inc. New York, USA, Mar. 2001, vol. 19, No. 3, Copyright 2001, IEEE, 6 pages.
Notification of Transmittal of the International Search Report and the Written Opinion of the International Searching Authority, or the Declaration; International Search Report and Written Opinion of The International Searching Authority for International Application No. PCT/US2013/047105 mailed on Oct. 29, 2013, 8 pages.
Non-Final Office Action for U.S. Appl. No. 09/953,714, mailed on Dec. 21, 2004, 16 pages.
Final Office Action for U.S. Appl. No. 09/953,714, mailed on Jun. 28, 2005, 17 pages.
Non-Final Office Action for U.S. Appl. No. 09/896,228, mailed on Jul. 29, 2005, 17 pages.
Non-Final Office Action for U.S. Appl. No. 09/953,714, mailed on Jan. 26, 2006, 15 pages.
Final Office Action for U.S. Appl. No. 09/953,714, mailed on Aug. 17, 2006, 17 pages.
Non-Final Office Action for U.S. Appl. No. 09/896,228, mailed on Mar. 5, 2007, 14 pages.
Final Office Action for U.S. Appl. No. 09/896,228, mailed on Aug. 21, 2007, 15 pages.
Non-Final Office Action for U.S. Appl. No. 09/896,228, mailed on Sep. 7, 2006, 17 pages.
Notice of Allowance for U.S. Appl. No. 09/896,228, mailed on Jun. 17, 2008, 20 pages.
Non-Final Office Action for U.S. Appl. No. 12/210,957, mailed on Sep. 2, 2009, 16 pages.
Notice of Allowance for U.S. Appl. No. 09/953,714, mailed on Sep. 14, 2009, 6 pages.
Notice of Allowance for U.S. Appl. No. 12/210,957, mailed on Feb. 4, 2010, 10 pages.
Non-Final Office Action for U.S. Appl. No. 12/333,029, mailed on May 27, 2010, 29 pages.
Non-Final Office Action for U.S. Appl. No. 12/333,029, mailed on Mar. 30, 2012, 14 pages.
Non-Final Office Action for U.S. Appl. No. 12/626,432 mailed on Jul. 12, 2012, 13 pages.
Non-Final Office Action for U.S. Appl. No. 12/913,572 mailed on Aug. 3, 2012, 6 pages.

(56) References Cited

OTHER PUBLICATIONS

Non-Final Office Action for U.S. Appl. No. 12/823,073 mailed on Aug. 6, 2012, 21 pages.
Notice of Allowance for U.S. Appl. No. 12/333,029 mailed on Aug. 17, 2012, 5 pages.
Non-Final Office Action for U.S. Appl. No. 12/913,598 mailed on Sep. 6, 2012, 10 pages.
Non-Final Office Action for U.S. Appl. No. 12/913,612 mailed on Sep. 19, 2012, 11 pages.
Non-Final Office Action for U.S. Appl. No. 12/913,650 mailed on Oct. 2, 2012, 9 pages.
Notice of Allowance for U.S. Appl. No. 12/913,572 mailed on Nov. 21, 2012, 7 pages.
Non-Final Office Action for U.S. Appl. No. 12/842,936 mailed on Nov. 28, 2012, 12 pages.
Final Office Action for U.S. Appl. No. 12/823,073 mailed on Jan. 23, 2013, 23 pages.
Notice of Allowance for U.S. Appl. No. 12/913,598 mailed on Mar. 12, 2013, 5 pages.
Notice of Allowance for U.S. Appl. No. 12/913,650 mailed on Mar. 25, 2013, 6 pages.
Notice of Allowance for U.S. Appl. No. 12/842,936 mailed on Apr. 8, 2013, 6 pages.
Final Office Action for U.S. Appl. No. 12/626,432 mailed on Apr. 12, 2013, 14 pages.
Non-Final Office Action for U.S. Appl. No. 12/842,945 mailed on Jun. 20, 2013, 14 pages.
Notice of Allowance for U.S. Appl. No. 12/913,598 mailed on Jul. 9, 2013, 6 pages.
Advisory Action for U.S. Appl. No. 12/626,432 mailed on Sep. 25, 2013, 4 pages.
Non-Final Office Action for U.S. Appl. No. 12/626,432 mailed on Nov. 21, 2013, 9 pages.
Notice of Allowance for U.S. Appl. No. 12/823,073 mailed on Feb. 19, 2014, 8 pages.
Final Office Action for U.S. Appl. No. 12/842,945 mailed on Mar. 7, 2014, 13 pages.
Final Office Action for U.S. Appl. No. 12/626,432 mailed on Jul. 3, 2014, 12 pages.
Non-Final Office Action for U.S. Appl. No. 13/925,696 mailed on Aug. 27, 2014, 8 pages.
Non-Final Office Action for U.S. Appl. No. 13/796,136 mailed on Sep. 8, 2014, 19 pages.
Non-Final Office Action for U.S. Appl. No. 12/842,945 mailed on Sep. 17, 2014, 7 pages.
Notice of Allowance for U.S. Appl. No. 13/925,696 mailed on Jan. 7, 2015, 6 pages.
Non-Final Office Action for U.S. Appl. No. 12/626,432 mailed on Jan. 15, 2015, 13 pages.
Non-Final Office Action for U.S. Appl. No. 13/770,751 mailed on Feb. 24, 2015, 10 pages.
Notice of Allowance for U.S. Appl. No. 13/925,723 mailed on Mar. 17, 2015, 5 pages.
Non-Final Office Action for U.S. Appl. No. 13/840,540 mailed on Mar. 23, 2015, 14 pages.
Final Office Action for U.S. Appl. No. 13/796,136 mailed on Mar. 27, 2015, 17 pages.
Non-Final Office Action for U.S. Appl. No. 13/621,138 mailed on Aug. 22, 2014, 6 pages.
Notice of Allowance for U.S. Appl. No. 13/621,138 mailed on May 11, 2015, 5 pages.
Non-Final Office Action for U.S. Appl. No. 14/050,263, mailed on Apr. 23, 2015, 5 pages.
Notice of Allowance for U.S. Appl. No. 12/842,945, mailed on Apr. 8, 2015, 9 pages.
Brocade ServerIron ADX 1000, 4000, and 8000 Series Frequently Asked Questions, 10 pages, Copyright 2009, (Rev. Apr. 2009), Brocade Communications Systems, Inc.
Cisco IP Routing Handbook, (Sep. 20, 2000), 24 pages, M&T Books.
CISCO Systems, Inc., "Graceful Restart, Non Stop Routing and IGP routing protocol timer Manipulation," Copyright 2008, (Rev. Jun. 2008) 4 pages.
CISCO Systems, Inc., "Intermediate System-to-Intermediate System (IS-IS) Support for Graceful Restart (GR) and Non-Stop Routing (NSR)," Copyright 2008 (Rev. Jun. 2008), pp. 1-3.
CISCO Systems, Inc., "Internet Protocol Multicast," Internetworking Technologies Handbook, 3rd Edition, (Dec. 2000), Chapter 43, 16 pages.
CISCO Systems, Inc., "Multicast Quick—Start Configuration Guide," Document ID:9356, Copyright 2008-2009, (Aug. 30, 2005), 15 pages.
Demers et al., "Analysis and Simulation of a Fair Queueing Algorithm," Xerox PARC, (Jan. 1990), 12 pages, ACM.
May, et al., "An Experimental Implementation of Traffic Control for IP Networks", (Jun. 23-25, 1997), 11 pages, Sophia-Antipolis Cedex, France.
TCP/IP Illustrated, vol. 2: The Implementation, Gray R. Wright and W. Richard Stevens, Addison-Wesley, (Feb. 10, 1995), 23 pages.
CISCO Systems, Inc., "Warm Reload," CISCO IOS Releases 12.3(2)T, 12.2(18)S, and 12.2(27)SBC, Copyright 2003, 14 pages.
Intel® Virtualization Technology, Product Brief, "Virtualization 2.0—Moving Beyond Consolidation", 2008, 4 pages.
Kaplan, "Part 3 in the Reliability Series: NSR™ Non-Stop Routing Technology," White Paper, Avici Systems, Copyright 2002, 8 pages.
Lee, et al., "Open Shortest Path First (OSPF) Conformance and Performance Testing," White Papers, Ixia—Leader in Convergence IP Testing, Copyright 1998-2004, pp. 1-17.
Vmware., "Automating High Availability (HA) Services With VMware HA", VMware Infrastructure, Copyright ®1998-2006, 15 pages.
Vmware, "Dynamic Balancing and Allocation of Resources for Virtual Machines", Product Datasheet, Copyright® 1998-2006, 2 pages.
Vmware, "Live Migration for Virtual Machines Without Service Interruption", Product Datasheet, Copyright® 2009 Vmware, Inc., 4 pages.
Vmware, "Resource Management with Vmware DRS", VMware Infrastructure, Copyright® 1998-2006, 24 pages.
Notice of Allowance for U.S. Appl. No. 13/621,138, mailed on Jul. 17, 2015, 5 pages.

\* cited by examiner mi_open(pool_name,
mi_open_params)
   pool_name – pool name string
   mi_open_params
      ACKed
      Delayed send timeout and buffer size
   Returns mi socket

FIG. 14A mi_sendmsg(mi_socket, dest, payload, send_parms)
   mi_socket – socket created with mi6_open()
   dest – sockaddr_mi
   payload – payload to send
   send_parms
      Priority
      Delayed send
      Delayed flush

FIG. 14B

ROLE BASED MULTICAST MESSAGING INFRASTRUCTURE

CROSS-REFERENCES TO RELATED APPLICATIONS

The present application is a non-provisional of and claims the benefit and priority under 35 U.S.C. §119(e) of U.S. Provisional Application No. 61/704,930, filed Sep. 24, 2012, entitled CHASSIS BASED MULTICAST MESSAGING INFRASTRUCTURE, the entire contents of which are incorporated herein by reference for all purposes.

BACKGROUND

The present disclosure relates to networking and more particularly to techniques for communicating messages between processing entities on a network device.

A networking device may have multiple processing entities within the device. Traditionally, the processing entities communicate with each other using the messaging schemes supported by the well-known networking layer protocols. One such well-known networking layer protocol from the Open System Interconnection (OSI) networking stack is the Internet Protocol (IP). IP facilitates delivery of packets from the source to the destination solely based on IP addresses. For this purpose, IP defines datagram structures that encapsulate the data to be delivered.

IP based addressing of the processing entities requires associating each processing entity with an IP address. IP addressing requires that the specific address of the intended recipient has to be known but there are situations where either this address is not known or determining the address requires extensive processing that adversely impacts the processing of the system/device. Therefore, IP based communication between the various processing entities does not allow flexibility in addressing of the processing entities.

BRIEF SUMMARY

Embodiments of the present invention provide techniques that enable messages to be sent to a processing entity within a computing device without knowing the IP address of the processing entity. In certain embodiments, instead of using an IP address of the processing entity, a message can be communicated to the processing entity using information indicative of a role or state or function performed by the processing entity.

For example, in a network device, a communication infrastructure is provided that enables messages or packets to be sent to one or more processing entities within the network device based upon roles, states, or functions performed by the one or more processing entities. The communication infrastructure allows multicasting of packets while ensuring reliable delivery of the packets. Further, the communication infrastructure allows for prioritizing of the packets, allows for delaying and buffering of the packets, and allows a packet to be multicast to multiple intended recipients. The communication infrastructure also provides various congestion control features including but not limited to providing back pressure notification.

In certain embodiments, a device may include a first processing entity configurable to transmit a packet comprising destination information, the destination information comprising a destination identifier and role identification information, the destination identifier identifying a set of one or more destinations, the role identification information identifying a role, and a second processing entity, wherein the second processing entity is further configurable to receive the packet, and determine, based upon the destination information of the packet, that the second processing entity is an intended recipient for the packet if the second processing entity is identified by the destination identifier and the second processing entity operates in a first role specified by role identification information. In one embodiment, the packet may be transmitted using an Ethernet protocol implemented in a networking stack executing on the first processing unit.

In one implementation, the packet may be assigned a priority class from a plurality of priority classes. The packet may also be delivered in the same order relative to other packets within the same priority class to the second processing unit that the packet is transmitted from the first processing unit.

In certain embodiments, the second processing entity may be further configurable to generate an acknowledgment packet for transmission to the first processing entity, upon determining that the second processing entity is the intended recipient. The first processing entity may be further configurable to release resources associated with the packet after receiving the acknowledgement packet for the packet. Also, the first processing entity is further configurable to retransmit the packet upon receiving an error packet or an expiry of a timer threshold.

In certain embodiments, a device may also include a third processing entity configurable to operate in a second role, wherein the third processing entity is further configurable to receive the packet, and determine, based upon the destination information of the packet, that the third processing entity is an intended recipient for the packet if the third processing entity is identified by the destination identifier and the third processing entity operates in a second role specified by role identification information. In one embodiment, the first role is an active role and the second processing entity is further configurable to perform a set of routing-related functions in the active role, and the second role is a standby role and the third processing entity is further configurable to not perform the set of routing-related functions in the standby role.

In certain embodiments, the third processing entity may also be configurable to switch to the first role from a second role, wherein the second processing entity is no longer available to operate in the first role, the third processing entity may be further configurable to receive the packet, and determine, based upon the destination information of the packet, that the third processing entity is an intended recipient for the packet if the third processing entity is identified by the destination identifier and the third processing entity operates in the first role specified by role identification information.

In certain embodiments, the second processing unit may be further configurable to determine that a memory buffer assigned for the application for receiving the packet for an application from the first processing unit is filled beyond a high threshold, and generate a congestion notification packet for the first processing unit, in response to determining that the memory buffer is filled beyond the high threshold. In other embodiments, the second processing unit may be further configurable to determine that the memory buffer assigned for an application for receiving packets from the first processing unit is cleared below a low threshold, and generate a clear notification packet for the first processing unit, in response to determining that the memory buffer is cleared below the low threshold.

The foregoing, together with other features and embodiments, will become more apparent when referring to the following specification, claims, and accompanying drawings.

BRIEF DESCRIPTION OF THE DRAWINGS

FIG. 14A and FIG. 14B are an exemplary Application Programming Interface (API) call routine for performing embodiments of the invention.

DETAILED DESCRIPTION

In the following description, for the purposes of explanation, specific details are set forth in order to provide a thorough understanding of embodiments of the invention. However, it will be apparent that the invention may be practiced without these specific details.

Certain embodiments of the present invention provide techniques that enable messages to be sent to a processing entity within a computing device without knowing the IP address of the processing entity. In certain embodiments, instead of using an IP address of the processing entity, a message can be communicated to the processing entity using information indicative of a role or state or function performed by the processing entity.

One or more packets may be used to communicate messages between processing entities. For example, if the size of the message is 5 KB and the maximum transmission unit for communicating between the processing entities is 1.5 KB, the message may be split into 4 packets, with the last packet containing 0.5 KBs. The packet may be a multicast packet or a multicast-related packet carrying information from one processing entity to another processing entity within the network device, so that the network device may provide multicasting functionality.

For example, in a network device, a communication infrastructure is provided that enables messages or packets to be sent to one or more processing entities within the network device based upon roles, states, or functions performed by the one or more processing entities. The communication infrastructure allows multicasting of packets while ensuring reliable delivery of the packets. Further, the communication infrastructure allows for prioritizing of the packets, allows for delaying and buffering of the packets, and allows a packet to be multicast to multiple intended recipients. The communication infrastructure also provides various congestion control features including but not limited to providing back pressure notification.

Figure 1:
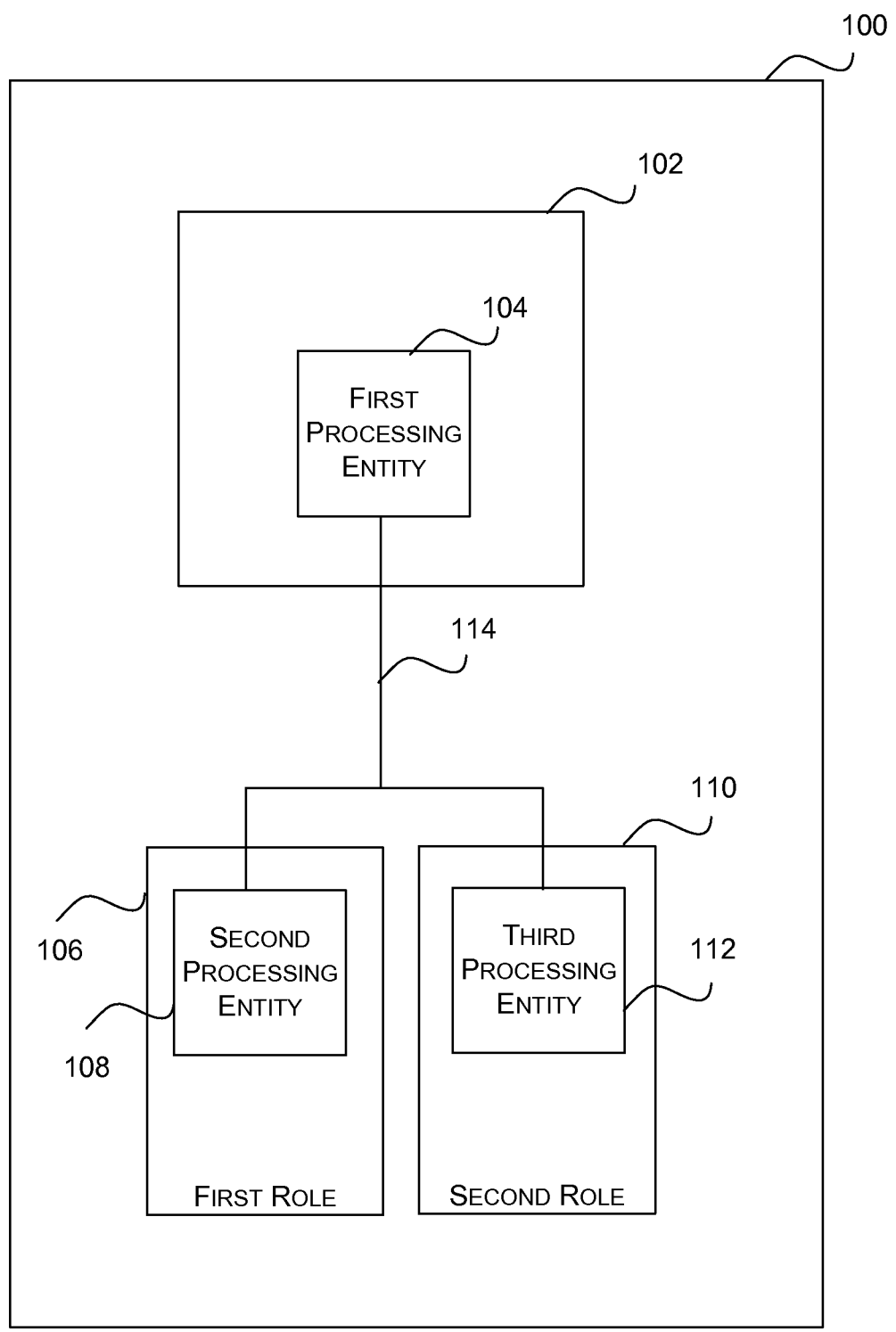
FIG. 1 is a simplified block diagram of a network device 100 that may incorporate an embodiment of the present invention.

FIG. 1 is a simplified block diagram of a network device 100 that may incorporate an embodiment of the present invention. Network device 100 may include multiple processing entities. As shown in FIG. 1, an exemplary network device 100 may comprise first processing entity 104, second processing entity 108 and third processing entity 112. In one embodiment, the first processing entity 104 may be physically coupled to a Circuit Board 102. Other resources may be available to the first processing entity 104, such as non-volatile (not shown) and volatile memory (not shown) coupled to the Circuit Board 102. In other implementations, a system-on-a-chip (SoC) may be used to interconnect components such as the processing entity with other computing resources, such as memory, instead of a Circuit Board. Similarly, the second processing entity 108 may be coupled to Circuit Board 106 and third processing entity 112 may be coupled to Circuit Board 110. The first processing entity 104, the second processing entity 108 and the third processing entity 112 may be electronically coupled together using bus 114.

Processing entities may include, but are not limited to physical processing units, logical processing units or virtual processing entities. In one implementation, processing entities may include a group of one or more processing units and control circuits. For instance, a processing entity may be a management card of a linecard. In another implementation, a processing entity may be a processing unit, such as an Intel, AMD, TI processor or ASIC running on a management or linecard. In yet another implementation, the processing entity may be a logical processing unit within a physical processing unit. In yet another implementation, the processing entity may be a virtual processing unit or a software partitioning such as a virtual machine, hypervisor, software process or an application running on a processing unit, such as a processor but are not limited to physical processing units, logical processing units or virtual processing entities.

One or more of the processing entities of network device 100 may operate in one or more roles. For example, in FIG. 1, second processing entity 108 may be operating in a first role and third processing entity 112 may be operating in a second role. In some embodiments, the role that a particular entity operates in may be based upon the functions that are performed by the processing entity.

Certain embodiments of the present invention enable packets to be sent to entities based upon the roles of the entities. For example, first processing entity 104 may desire to transmit a packet to a processing entity operating in a particular first role (e.g., the first role) but may not know the exact IP or MAC address of the processing entity that is operating in that particular role. A communication infrastructure is provided that enables the packet sent by the first processing entity to be addressed to an entity operating in a particular role without needing the IP or MAC address of the entity. The communication infrastructure ensures that the packet is reliably communicated to the one or more processing entities operating in the particular role.

For example, first entity 104 may wish to transmit a message to a processing entity operating in the second role. Certain embodiments of the present invention enable first entity 104 to address the message to be sent using the first role as an addressing parameter. The message is then reliably communicated to all entities operating in the first role. Since the message is communicated to all entities that may be operating in the first role, the communication infrastructure acts as a multicast architecture that enables a message to be multicast to several possible recipients based upon the roles of the recipients. Accordingly, the communication infrastructure provides for multicasting while providing for reliable delivery of messages.

Figure 3:
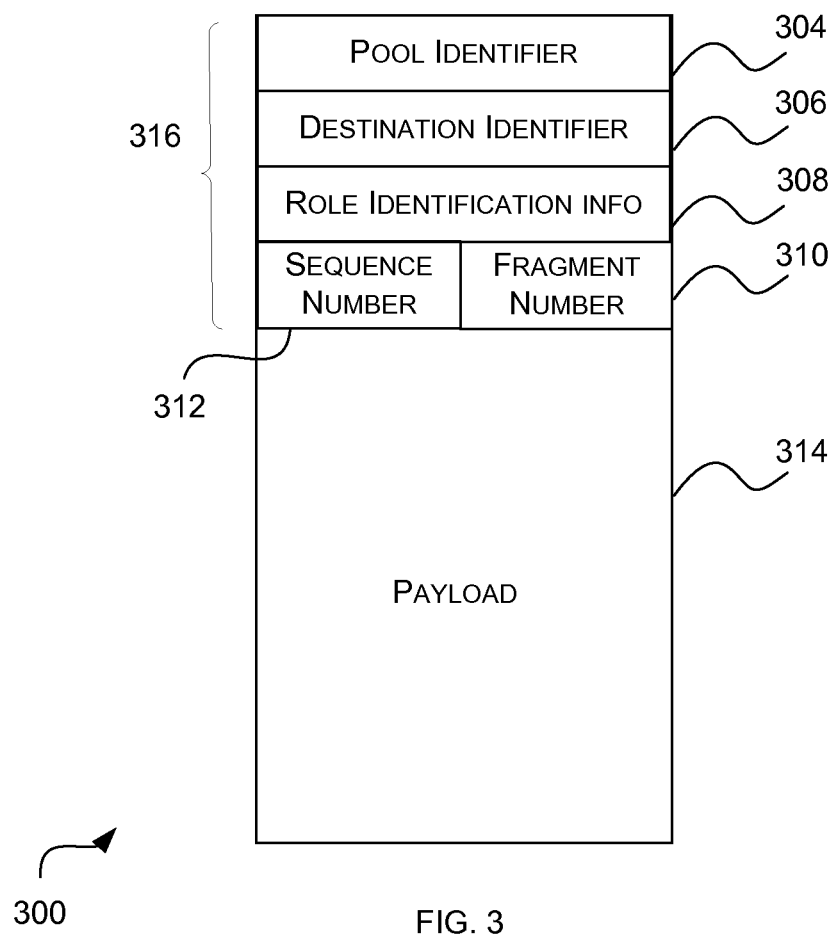
FIG. 3 is a simplified block diagram illustrating an exemplary packet for performing embodiments of the present invention.

Accordingly, the role of the recipient is used as part of the addressing scheme for sending a packet to its intended destination. FIG. 3 is an exemplary figure illustrating various fields in a packet according to an embodiment of the present invention. The placement of the fields may be altered without altering the scope of the disclosure. As shown in FIG. 3, packet 300 may comprise a header section 316 and a payload section 314. Header section 316 comprises information related to the packet including information indicative of the destination of the packet. Payload 314, also referred to as the body or data portion of a packet, stores that actual data or message that is to be communicated to the destination.

In one implementation, the processing entities may determine the various roles present in the network device using presence information. The presence information for the various roles of the processing entities and applications in the network device may be published to the processing entities in the system. In another embodiment, the sending entity or application may either learn or request the presence information for determining the available roles in the network device. The presence information allows the sender of the packet to determine if a role is present or not present in the network device. This may be advantageous in avoiding relying on retries for determining if a specific role is available in the network device and serviced by the processing entities of the network device. In one example, a processing entity or an application executing on a processing entity may be notified that a specific role is available in the system at which point the processing entity or the application executing on the processing entity may send packets targeted to that role.

At a layer below the MI layer, at the Data Link Layer, the packet encapsulation may have a protocol class field (not shown). Protocol class field may store information identifying the name of the protocol being used for communicating the packet. For example, for packets being communicated according to the unique protocol disclosed herein, a protocol class name such as "ETH_P_MI" may be used to signify that the packet belongs to a Messaging Infrastructure (MI) class according to teachings of the present invention. Identifying the messaging protocol allows the processing entities to appropriately decode the rest of the packet. MI is a network/Transport layer protocol described herein for facilitating transmitting and receiving packets to destinations that are identified based upon the roles of the destinations.

In the embodiment depicted in FIG. 3, header 316 comprises pool identifier field 304, destination identifier field 306, role identifier field 308, sequence number field 312, and fragment number field 310.

Pool identifier field 304 stores information that associates the packet with an application. The pool identifier field 304 allows the source processing entity to communicate with the application on the destination processing entity. The pool identifier field 304, in other words, specifies the application role. Any applications interested in communicating with applications servicing a specific role can send messages to a pool name using the pool identifier field 304 in the packet. Instantiations of the same application running on multiple processing entities may use a common pool name.

In certain embodiments, destination identifier field 306 and role identification information field 308 collectively store information that identified the destination for the packet. These two fields may thus collectively be referred to as destination information for the packet and may identify one or more intended destinations or recipients for the packet. Destination identifier field 306 may identify one or more destination processing entities while role identification information field 308 may further indicate that, from the one or more processing entities identified by the destination identifier field 306, the packet is intended for a processing entity operating in a specific role specified by role identifier field 308. In one implementation, the information stored by destination identifier field 306 may be a bitmap identifying the various processing entities in network device 100. Examples of roles may include, but are not limited to one processing entity operating in an active role and another processing entity operating in a standby role.

The active role and the standby role referred to above relate to the active-standby model that is used by many network devices to enhance the availability of the network device. According to the active-standby model, a network device may comprise two processing units (e.g., two processors, two sets of virtual machines, etc.) where one of the processing units is configured to operate in an "active" mode and the other is configured to operate in a "passive" (or standby) mode. The processing unit operating in the active mode (referred to as the active processing unit) is generally configured to perform a full set of networking functions while the processing unit operating in passive mode (referred to as the passive processing unit) is configured to not perform the full set of networking functions or to perform only a small subset of the functions performed by the active unit. Upon an event that causes the active processing unit to reboot or fail (referred to as a switchover or failover event), which may occur, for example, due to an error in the active unit, the passive processing unit starts to operate in active mode and starts to perform functions that were being performed by the other processing entity in active mode. The previous active processing unit may start to operate in standby mode. Processing entities that are operating in active mode may thus be operating in the active role and processing entities operating in the standby mode may thus be operating in the standby role.

Packet header 316 may have additional fields including sequence number field 312, fragment number field 310, last fragment flag field (not shown), acknowledgment and reliability requirements fields (not shown), and other control information fields that are discussed in more detail below.

Referring back to FIG. 1, first processing entity 104 may send a packet where destination identifier field 306 of the packet identifies second processing entity 108 and third processing entity 112 and role identification information field 308 of the packet specifies a first role. In one implementation, both second processing entity 108 and third processing entity 112 receive the packet. However, third processing entity 112 discards the packet since the packet is intended only for the processing entity operating in the first role, whereas the third processing entity 112 is operating in the second role. However, third processing entity 112 discards the packet since the packet is intended only for a processing entity operating in the first role, and third processing entity 112 knows that it is not operating in the first role but instead operating in the second role.

In some other embodiments, instead of or in addition to the role identification information, the packet may also include a state indicator field that stores information indicating a state of the intended destination processing entity. If such a state is identified, a processing entity has to be in the specified state (possibly, in addition to the specified role) to accept and process the packet. For instance, a wakeup packet may be intended for a processing entity in a power management state of "deep sleep". Similarly, a flush cache packet may be intended for one or more processing entities with a cache state that is "full" or "close to full".

Figure 2:
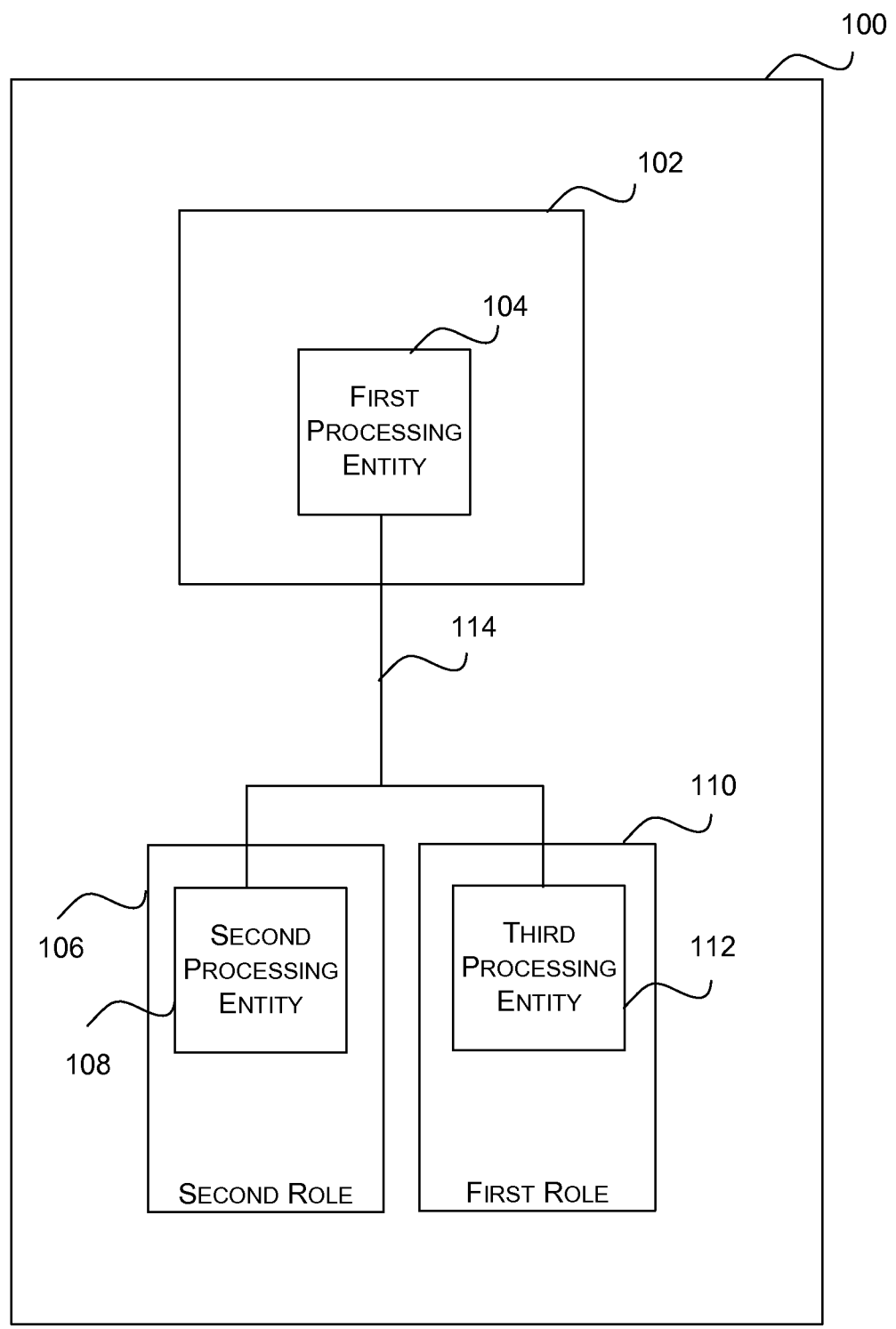
FIG. 2 is another simplified block diagram of the network device 100 that may incorporate another embodiment of the present invention.

In some situations it is possible that, after first processing entity 104 sends a packet intended for a processing entity operating in the first role but before the packet is actually delivered to the intended destination, an event occurs that causes the roles of the processing entities to be changed. For example, as shown in FIG. 2, the event may cause second processing entity 108 and third processing entity 112 to switch roles such that second processing entity 108 is now operating in the second role and third processing entity 112 is now operating in the first role. In such a scenario, when the packet reaches second processing entity 108 and third processing entity 112, second processing entity 108 may discard the packet since the role criterion specified in the packet is not satisfied by the second processing entity. Third processing entity 112 may now accept the packet since it satisfies both the destination identifier and rile indicator criteria specified by the packet. Third processing entity 112 may commence additional processing of the packet. This is to be contrasted with the situation in FIG. 1 where the same packet with the same destination identifier and role identification information would have been accepted by second processing entity 108, and discarded by third processing entity 112.

In this manner, the addressing scheme according to certain embodiments of the present invention enables a packet to be correctly delivered to its correct intended destination (or multiple destinations) as identified by the destination identifier and role identification information. The packet is reliably delivered to the correct destination without the sender (first processing entity 104) having to resend the packet (e.g., after a switchover event) or without the sender having to even know which particular processing entity is in which particular role.

The switchover of the roles mentioned above between the processing entities may occur due to a myriad of reasons, including anticipated or voluntary events and unanticipated or involuntary events. In one embodiment, the switchover of roles may occur due to the inability of a processing entity to continue to operate in the current role. A voluntary or anticipated event is typically a voluntary user-initiated event that is intended to cause the active processing entity to voluntarily yield control to the standby processing entity. An instance of such an event is a command received from a network administrator to perform a switchover. There are various situations when a network administrator may cause a switchover to occur on purpose, such as when software on one of the processing entities and the associated memories are linecards to be upgraded to a newer version. As another example, a switchover may be voluntarily initiated by the system administrator upon noticing performance degradation on the active processing entity or upon noticing that software executed by the active processing entity is malfunctioning. In these cases, the network administrator may voluntarily issue a command that causes a switchover, with the expectation that problems associated with the current active processing entity will be remedied when the standby processing entity becomes the new active processing entity. A command to cause a switchover may also be initiated as part of scheduled maintenance. Various interfaces, including a command line interface (CLI), may be provided for initiating a voluntary switchover.

An involuntary or unanticipated switchover (also sometimes referred to as a failover) may occur due to some critical failure (e.g., a problem with the software executed by the active processing entity, failure in the operating system loaded by the active processing entity, hardware-related errors on the active processing entity or other router component, and the like) in the active processing entity.

For example, the first role may be an active role and the second role may be a standby role. As depicted in FIG. 1, the second processing entity 108 may be initially in an active role and the third processing entity 112 may be in a standby role. The third processing entity 112 may have synchronized its state to continue the networking function upon switching of the roles. For example, in one implementation, the caches of the third processing entity 112 may be kept up to date or sufficiently up to date to seamlessly transition from a standby role to an active role.

If the second processing entity 108 encounters an error, requires a reboot or a software upgrade, the second processing entity 108 may switch roles with the third processing entity 112, as shown in FIG. 2. Now the second processing entity 108 has the standby role and the third processing entity 112 has the active role.

Figure 4:
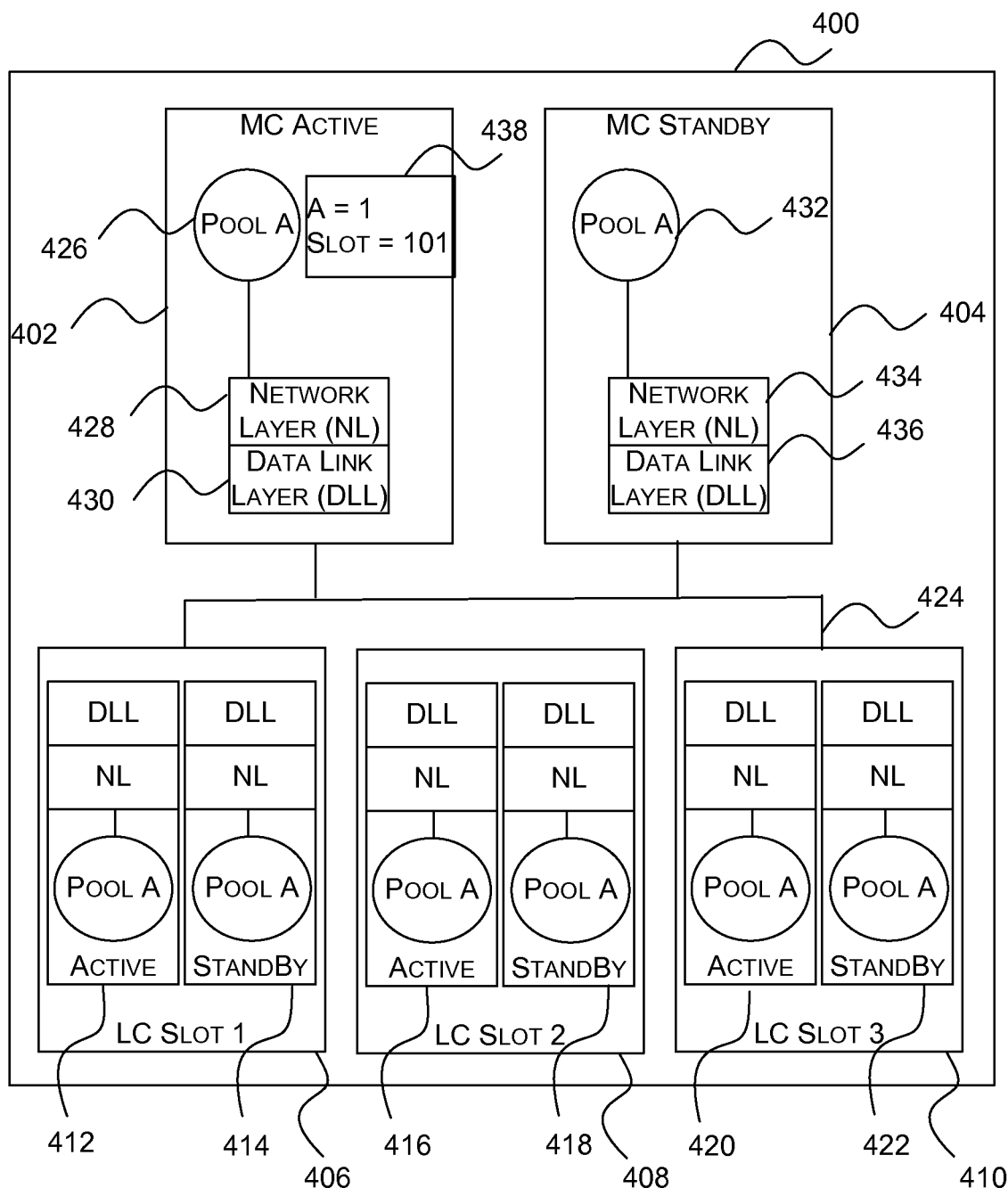
FIG. 4 is yet another simplified block diagram of the network device that may incorporate embodiments of the present invention.

FIG. 4 is another simplified block diagram of a network device 400 that may incorporate an embodiment of the present invention. Network device 400 may be a router or switch that is configured to forward data such as a router or switch provided by Brocade Communications Systems, Inc. In one implementation the network device 400 may be configured to perform multicast packet forwarding. The multicast routing services include services and functions related to facilitating routing of multicast data. In one embodiment, network device 400 provides non-stop routing capability for multicast routing even in the event a switchover occurs.

The network device 400 may comprise a plurality of ports (not shown) for receiving and forwarding data packets and multiple cards that are configured to perform processing to facilitate forwarding of the data packets. The multiple cards may include one or more linecards (412, 414, 416, 418, 420, and 422) and one or more management cards (402 and 404). Each card may have one or more processing entities and various other computing resources, such as volatile and non-volatile memory. Although referred to as a management card or linecard, the card may be a System of a Chip (SoC) or a circuit board. A card, sometimes also referred to as a blade or module, can be inserted into the chassis of network device 400. This modular design allows for flexible configurations with different combinations of cards in the various slots of the device according to differing network topologies and switching requirements. The components of network device 400 depicted in FIG. 4 are meant for illustrative purposes only and are not intended to limit the scope of the invention in any manner. Alternative embodiments may have more or less fewer components than those shown in FIG. 4.

The network device 400 may have linecard slots referred to as LC slots (406, 408 or 410), in FIG. 4. In one implementation, a linecard slot may include multiple cards, referred to as linecards. In another implementation, a linecard slot may include one card with multiple processing units, operating and referred to as individually a linecard. For example, referring to LC slot 1 (406), 412 may be a first linecard with a first processing entity and 414 may be a second linecard with a second processing entity. In the alternative, LC slot 1 (406) may represent a single card with multiple processing entities, such as a first processing entity 412 and a second processing entity 414.

Network device 400 is configured or configurable to receive and forward data using ports. Upon receiving a data packet via an input port, network device 400 is configured to determine an output port for the packet for transmitting the data packet from the network device 400 to another neighboring network device or network. Within network device 400, the packet is forwarded from the input port to the determined output port and transmitted from network device 400 using the output port. In one embodiment, forwarding of packets from an input port to an output port is performed by one or more linecards. Linecards represent the data forwarding plane of network device 400. Each linecard may comprise a packet processing entity programmed to perform forwarding of data packets from an input port to an output port. A packet processing entity on a linecard may also be referred to as a linecard processing entity. Each packet processing entity may have associated memories to facilitate the packet forwarding process. Since processing performed by a packet processing entity needs to be performed at a high packet rate in a deterministic manner, the packet processing entity is generally a dedicated hardware device configured to perform the processing. In one embodiment, the packet processing entity is a programmable logic device such as a field programmable gate array (FPGA). The packet processing entity may also be an ASIC.

Management card (402 and 404) is configured to perform management and control functions for network device 400 and thus represents the management plane for network device 400. In one embodiment, management cards (402 and 404) are communicatively coupled to linecards using bus 424 and include software and hardware for controlling various operations performed by the linecards. One or more management cards may be used, with each management card controlling one or more linecards.

A management card (402 and 404) may comprise one or more management processing entities that are configured to perform functions performed by the management card and associated memory. Memory may be configured to store various programs/code/instructions and data constructs that are used for processing performed by the processing entity of the management card (402 and 404). For example, programs/code/instructions, when executed by the processing entity, cause the next-hop information to be stored in an optimized manner in memory. In one embodiment, the processing entity is a general purpose microprocessor such as a PowerPC, Intel, AMD, or ARM microprocessor, operating under the control of software stored in associated memory.

In one embodiment, the functions performed by management card (402 and 404) include maintaining a routing table, creating associations between routes in the routing table and next-hop information, updating the routing table and associated next-hop information responsive to changes in the network environment, and other functions. In one embodiment, a management processing entity on the management card is configured to program the packet processing entities and associated memories of linecards based upon the routing table and associated next-hop information. Programming the packet processing entities and their associated memories enables the packet processing entities to perform data packet forwarding in hardware. As part of programming a linecard packet processing entity and its associated memories, the management processing entity is configured to download routes and associated next-hops information to the linecard and program the packet processor and associated memories. Updates to the next-hop information are also downloaded to the linecards to enable the packet processors on the linecards to forward packets using the updated information. Embodiments of the invention enable efficient communication between the various processing entities within the network device 400 using a Messaging Infrastructure networking layer protocol for performing embodiments of the invention as discussed herein.

In one exemplary configuration of network device 400, the network device 400 has an active management card 402 and a standby management card 404. Furthermore, the network device 400 may have one of more slots. As shown in FIG. 4, the network device has 3 slots (406, 408 and 410) and each slot has an active linecard and a standby linecard. For example, linecard slot 1 (406) has an active linecard 412 and a standby linecard 414.

During normal operation of the network device 400, one of the two management cards 402 and 404 operates in active role while the other management card operates in standby role. The management card operating in active mode is referred to as the active management card and is responsible for performing the control and forwarding functions, including functions for providing multicast services, for network device 400. The other management card operates in standby mode and is referred to as the standby management card and does not perform the functions performed by the active management card. The active management card comprises the active management processing entity and the standby management card comprises the standby processing entity. In the embodiment depicted in FIG. 4, management card 402 is the active management card and management card 404 is the standby management card. A switchover may, however, cause management card 404 to become the active management card and management card 402 to become the standby management card.

Similarly, each slot may have an active and a standby linecard. During normal operation of the network device 400, one of the two linecards (412 and 414) from the slot 406 operates in active role while the other management card operates in standby role. The linecard operating in active role is referred to as the active linecard and is responsible for providing multicast services, for network device 400. The other linecard operates in standby mode and is referred to as the standby linecard and does not perform the functions performed by the active linecard. The active linecard comprises the active linecard processing entity and the standby linecard comprises the standby processing entity. In the embodiment depicted in FIG. 4, for slot 406, linecard 412 is the active linecard and linecard 414 is the standby linecard; for slot 408, linecard 416 is the active linecard and linecard 418 is the standby linecard; and for slot 410, linecard 420 is the active linecard and linecard 422 is the standby linecard. A switchover may, however, cause the active linecard to become the standby linecard and the standby linecard to become the active linecard.

During normal operations, the active processing entities of the network device 400 are configurable to manage the hardware resources of network device 400 and perform a set of networking functions. During this time, the standby processing entities may be passive and may not perform the set of functions performed by the active processing entities. When a switchover occurs, the standby processing entities become the active processing entities and take over management of hardware resources and performance of the set of functions related to network device 400 that were previously performed by the processing entity that was previously active and, as a result, the set of functions continues to be performed. The previous active partition may then become the standby partition and be ready for a subsequent switchover. For example, for the embodiment depicted in FIG. 4, for slot 406, a switchover will cause standby linecard 414 to become the new active linecard and active linecard 412 to become the new standby linecard. The set of functions that are performed by an active processing entity on the active card may differ from one network device to another. The active-standby model coupled with techniques described in this application enable the set of functions including functions to be performed without any interruption and any disruption to the applications even during or after a switchover. This translates to higher availability of network device 400.

A switchover may be caused by various different events, including anticipated or voluntary events and unanticipated or involuntary events. A voluntary or anticipated event is typically a voluntary user-initiated event that is intended to cause the active card to voluntarily yield control to the standby card. An instance of such an event is a command received from a network administrator to perform a switchover. There are various situations when a network administrator may cause a switchover to occur on purpose, such as when software on the management card and linecard processors is to be upgraded to a newer version. As another example, a switchover may be voluntarily initiated by the system administrator upon noticing performance degradation on the active card or upon noticing that software executed by the active card is malfunctioning. In these cases, the network administrator may voluntarily issue a command that causes a switchover, with the expectation that problems associated with the current active card will be remedied when the standby card becomes the new active card. A command to cause a switchover may also be initiated as part of scheduled maintenance. Various interfaces, including a command line interface (CLI), may be provided for initiating a voluntary switchover.

An involuntary or unanticipated switchover (also sometimes referred to as a failover) may occur due to some critical failure (e.g., a problem with the software executed by the active card, failure in the operating system loaded by the active card, hardware-related errors on the active card or other router component, and the like) in the active card.

In one embodiment, network device 400 is able to perform a switchover without interrupting the network services offered by network device 400. Network device 400 is able to continue providing network services at line rates while performing a switchover without experiencing any packet loss after or due to a switchover. Accordingly, network device 400 is able to perform switchovers without impacting the forwarding of multicast packets during or as a result of the switchover.

In one embodiment, the standby card also maintains multicast information and the multicast information is periodically synchronized with the multicast information maintained by the active MP. Various synchronization techniques are used to synchronize the multicast information maintained by the standby card with multicast information maintained by the active card. In one embodiment, the messages may be sent to both the active and standby cards so that the standby card may also update the information. In another embodiment, the active and standby processing entities may exchange multicast information to synchronize the multicast information.

Figure 5:
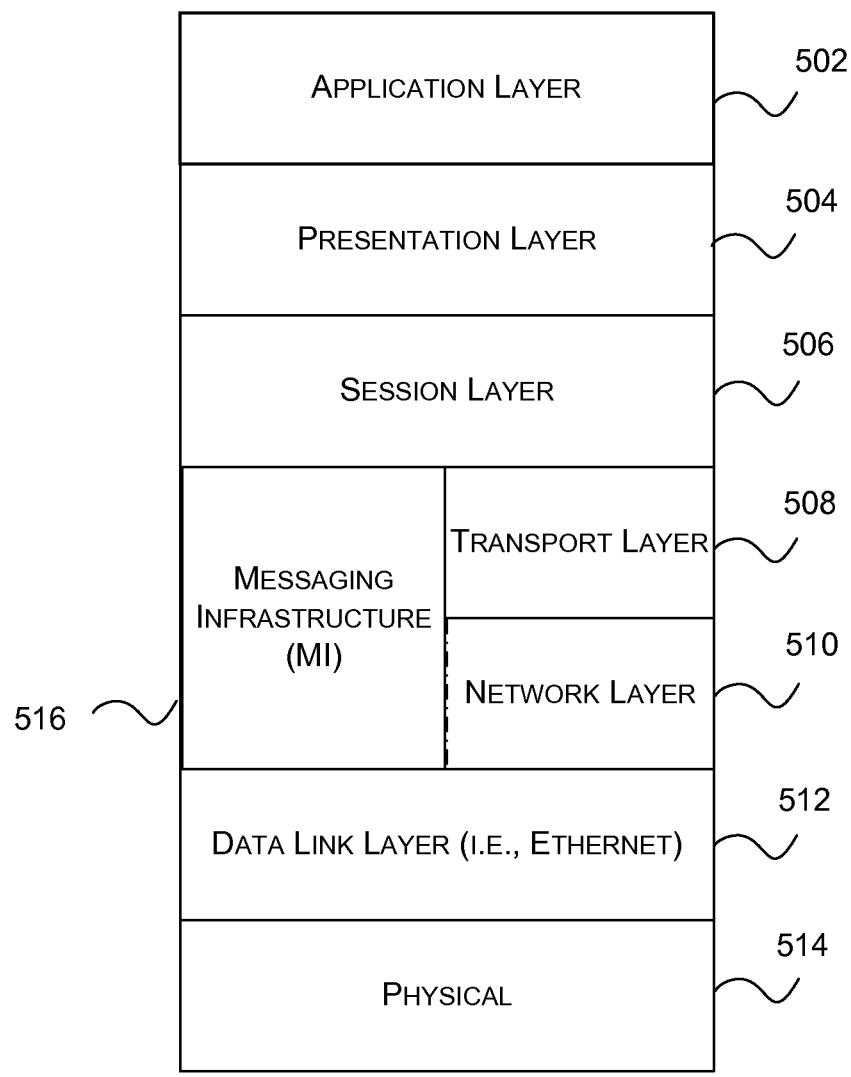
FIG. 5 depicts an exemplary OSI network stack for the networking protocols used in one embodiment of the present invention.

The network device 400 of FIG. 4 illustrates a distributed software model wherein each (active and standby) card on the network device 400 has a processing entity executing its own operating system, and networking and application stack to perform collective routing tasks for the network device. The processing entities may communicate with each other over the bus 424. In one embodiment, the processing entities communicate with each other using networking protocols. FIG. 5 depicts an exemplary OSI network stack for the networking protocols used in embodiments of the invention. Each card shown in FIG. 4 depicts the network layer (NL) (428, 434, etc.) and the data link layer (DLL) (430, 436, etc.) of the OSI network stack executing on the card. However, the processing entities on the cards may execute any number of the protocol layers from the OSI network stack, as depicted in FIG. 5, for communicating with each other.

Certain embodiments of the invention may implement a novel Network layer and transport layer protocol, referred to as Messaging Infrastructure (MI) 516 in this disclosure, and depicted in FIG. 5, for optimized communication amongst the various processing entities within the network device 400. In one implementation, MI may use the Ethernet backbone as the Data Link Layer for communicating amongst processing entities.

FIG. 5 illustrates an OSI network stack that may be used in embodiment of the invention. A network device may have multiple processing entities within the device. In a distributed software model, each processing entity may execute one or more applications running on an operating system and network system. The network system may comprise a network stack, such as the OSI network stack 500, shown in FIG. 5. The OSI network stack 500 may comprise the physical layer 514, the data link layer 512, the network layer (510 and 516), the transport layer (508 and 516), the session layer 506, the presentation layer 504 and the application layer 502.

Out of these layers from the OSI network stack, the network layer provides the functional and procedural means of transferring variable length data sequences from a source to a destination, while maintaining the quality of service. One well-known network layer protocol from the OSI network stack is the Internet Protocol (IP). IP facilitates delivery of packets from the source to the destination solely based on IP addresses. For this purpose, IP defines datagram structures that encapsulate the data to be delivered. IP based addressing of the processing units requires associating each processing entity with an IP address. Therefore, IP based communication between the various processing entities does not allow flexibility in addressing the processing entities based on the role or state of the processing entity. For example, a networking device may have a processing entity in an active role and a processing entity in a standby role. IP based addressing does not facilitate communication between the two entities using the role or state of the device. For instance, an application executing on the first processing entity that needs to communicate with a second processing entity in an active role must first discover the current role of the one or more processing entities before communicating with the active processing entity.

Furthermore, if the role of the second processing entity changes while the first processing entity is communicating with the processing entity, the application executing on the first processing entity needs to account for the change in the role of the second processing entity. Discovering and keeping track of the roles of the various processing entities in the network device complicates the application programming interface, increases the overhead and introduces errors into the system.

Embodiments of the invention describe an alternate implementation of the Network layer protocol and transport layer protocol, referred to as Messaging Infrastructure (MI) in this disclosure. As shown in FIG. 5, in one implementation, MI may co-exist with other Network layer protocols, such as IP. As discussed in FIG. 1, FIG. 2, and FIG. 4, an instantiation of MI executing on any of the processing entities may be configurable to retain hardware awareness. Hardware awareness may refer to the awareness of the role the processing entity is currently in. For instance, referring back to FIG. 1, an instantiation of MI executing on second processing entity 108 may be aware that the second processing entity 180 is operating in a first role and an instantiation of MI executing on the third processing entity 112 may be aware that the third processing entity 112 is operating in a second role. Similarly, now referring back to FIG. 4, on slot 406, an instantiation of MI executing on linecard 412 may be aware that its own role is the active linecard with the active processing entity, and an instantiation of the MI executing on the linecard 414 may be aware that its own role is the standby linecard with the standby processing entity. MI protocol may also include mechanisms for reliable delivery of packets, prioritizing packets, delaying and buffering packets and providing back pressure notification for congestion control. These techniques are discussed in more details in the figures below.

Figure 6:
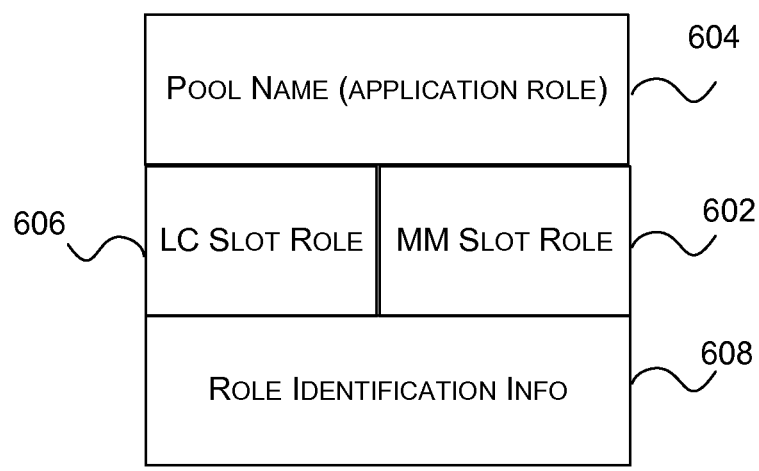
FIG. 6 illustrates an exemplary addressing scheme for performing embodiments of the invention.

FIG. 6 illustrates an exemplary scheme for performing embodiments of the invention, such as specifying the destination for a packet. FIG. 6 shows a subset of fields described in FIG. 3 and is specific to a particular implementation, such as the implementation shown in FIG. 4. FIG. 6 is shown for illustration purposes and may not be construed to limit the scope of the invention.

The LC slot role field 606 comprises slot bit information to identify the LC slot number in the network device 400 that the packet is targeted for. However, in an alternative implementation, the LC slot bits may also refer to a virtual slot. A virtual slot may be migrated from one physical card or processing unit to another. In one implementation, each slot on the network device may be represented by a bit in the bitmap, allowing for multiple destinations to be addressed using the same packet. Other known and novel methods may be used for selecting the slots on the network device, without departing from the scope of the invention. As shown in FIG. 6, the header may also have a MM slot role field 602, for assigning bits to the management cards in the addressing scheme for communicating with the management cards and their associated processing entities. In FIG. 4, in one example, as shown in block 438, the slot bits of the address may be set to "101", wherein the first bit is set to "1," the second bit is set to "0," and the third bit is set to "1" by the processing entity at management card 402. If Slot 1 is bit 0, Slot 2 is bit 1 and Slot 3 is bit 2 in the slot bits field information of the slot bits field 606, then setting the slot bits to 101 may select Slot 1 and Slot 3.

The role identification information field 608 may include role identification information for additionally specifying the role of the intended destination processing entity. In FIG. 4, the management and linecards are either in active or standby role. As shown in block 438 of FIG. 4, the management card 402 may generate a packet with the active (A) bit set in the addressing scheme intended for the active linecard on the slot. In one embodiment, the management card may send a message to an active linecard for forwarding outside the network device 400. For example, the packet arriving at the active linecard may be sent out an egress port of the linecard. An MI message can be routed to an outbound IP flow if a mapping is configured at the linecard. In one additional aspect, the MI message may be routed to another chassis.

In one implementation, the management card 402 may use presence information in determining the roles available in the network device. The presence information for the various roles of the processing entities and applications in the network device may be published to the various processing entities in the system. In another embodiment, the sending entity or application may either learn or request the presence information for determining the available roles in the network device. The presence information allows the sender of the packet to determine if a role is present or not present in the network device. This may be advantageous in avoiding relying on retries for determining if a specific role is available in the network device and serviced by the processing entities of the network device. In one example, a processing entity or an application executing on a processing entity may be notified that a specific role is available in the system at which point the processing entity or the application executing on the processing entity may send packets targeted to that role.

The pool name field 604 includes pool name information for identifying a pool associated with an application running on one or more processing entities. The processing entities may be configured to execute instantiations of one or more applications. An application running on the source processing entity may communicate with an application running on a destination processing entity by associating a packet to a pool name specified in the pool name field 604. In FIG. 4, the source application executing on the processing entity of the management card may interact with the processing entity on the linecards using Pool A (426, 432).

The pool name field 604, in other words, may specify the application role. Any applications interested in communicating with applications servicing a specific role can send messages to a pool name using the pool identifier field 604 in the packet. In one implementation, a well-known list may be published to all processing entities, so that the processing entities may communicate with applications across different processing entities.

Therefore, in FIG. 4, the packet transmitted from management card 402 with the pool name information in the pool name field 604 set to Pool A, the slot bits information in the slot bits field 606 set to "101" and the role identification information in the role identification information field 608 set to Active for linecards are destined for applications associated with Pool A, communicating through the MI protocol on the active linecards 412 and 420. If for any reason, the active linecard and the standby linecard switch on any of the slots, the packet is automatically routed to the right linecard without any disruption. In the unlikely event that the packet is lost in transmission, and if it is a packet that requires an acknowledgment, the sender may automatically resend the packet in response to not receiving an acknowledgment for the packet. The retransmission protocol is further discussed in more detail in FIG. 10 and FIG. 11.

Figure 7:
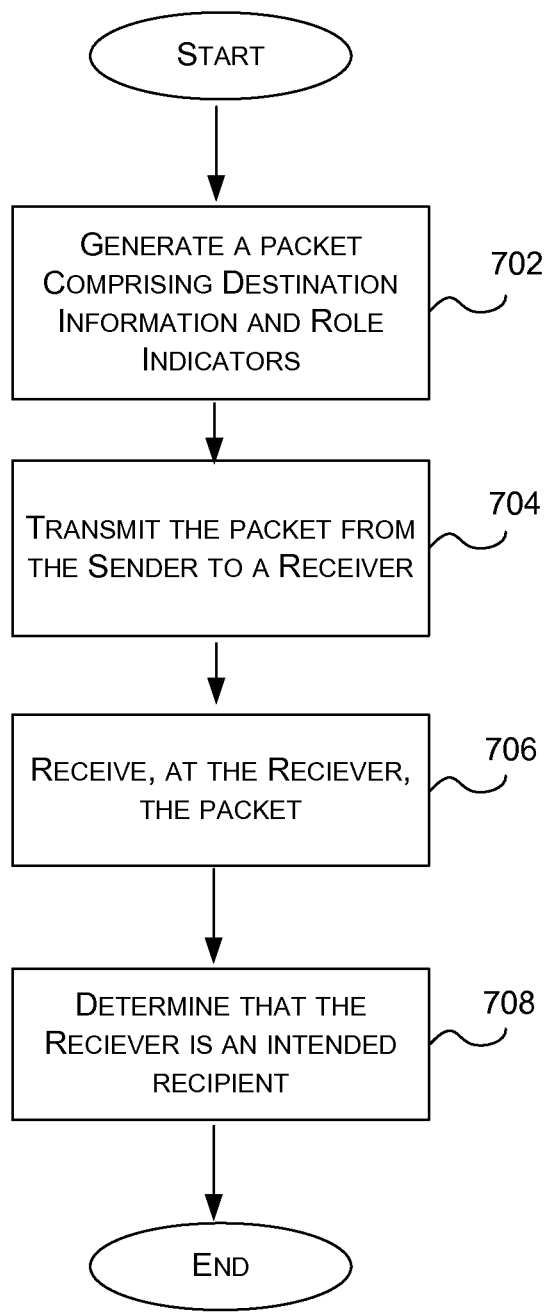
FIG. 7 is a flow diagram, illustrating a method for performing embodiments of the invention.

FIG. 7 is a flow diagram illustrating a method according to one or more illustrative aspects of the disclosure. According to one or more aspects, any and/or all of the methods and/or method steps described herein may be implemented by components of the network device 100 described in FIG. 1. In other implementations, the method may be performed by components of the network device described in FIG. 4, FIGS. 15A and 15B. In one embodiment, one or more of the method steps described below with respect to FIG. 7 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At Step 702, a sender may generate a packet and specify destination information for the packet identifying one or more intended destinations or recipients for the packet. According to an embodiment of the present invention, the specifying of the destination information includes specifying a destination identifier 306, specifying role identification information 308 and specifying a pool name 304 (application role).

In one implementation, presence information for the various roles of the processing entities and applications in the network device may be published to the various processing entities in the system. In another embodiment, the sending entity or application may either learn or request the presence information for determining the available roles in the network device. The presence information allows the sender of the packet to determine if a role is present or not present in the network device. This may be advantageous in avoiding relying on retries for determining if a specific role is available in the network device and serviced by the processing entities of the network device. In one example, a processing entity or an application executing on a processing entity may be notified that a specific role is available in the system at which point the processing entity or the application executing on the processing entity may send packets targeted to that role.

At Step 704, the sender may transmit the packet from the sender to one or more receivers. One of the receivers may be operating in a first role.

At Step 706, one or more receivers may receive the packet. At Step 708, one of the one or more receivers may determine that they are the intended recipient based on the destination identifier from the packet and that a first role identification information from the packet is set to the first role. In one implementation, the one or more receivers may generate an acknowledgment packet for transmission to the sender, upon determining that the receiving entity is the intended recipient. In response, the sender may unblock the resources, such as memory buffer after receiving the acknowledgement packet for the packet. Furthermore, in one implementation, the sender may resend the packet to the second processing entity upon receiving an error packet or an expiry of a timer threshold.

In one implementation, one of the receivers may operate in a second role and receive the packet. The receiver may determine that the receiving entity is also the intended recipient based on the destination identifier from the packet and that a second role identification information from the packet is set to the second role. In one exemplary scenario, two receivers may switch roles, wherein one of the receivers is no longer available to operate in a particular role.

For example, for the embodiment depicted in FIG. 4, the sender is the active management card 402. The receiver in the first role may be the linecard 412 in an active role. And the receiver in the second role may be the linecard 414 in the standby role.

It should be appreciated that the specific steps illustrated in FIG. 7 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 8:
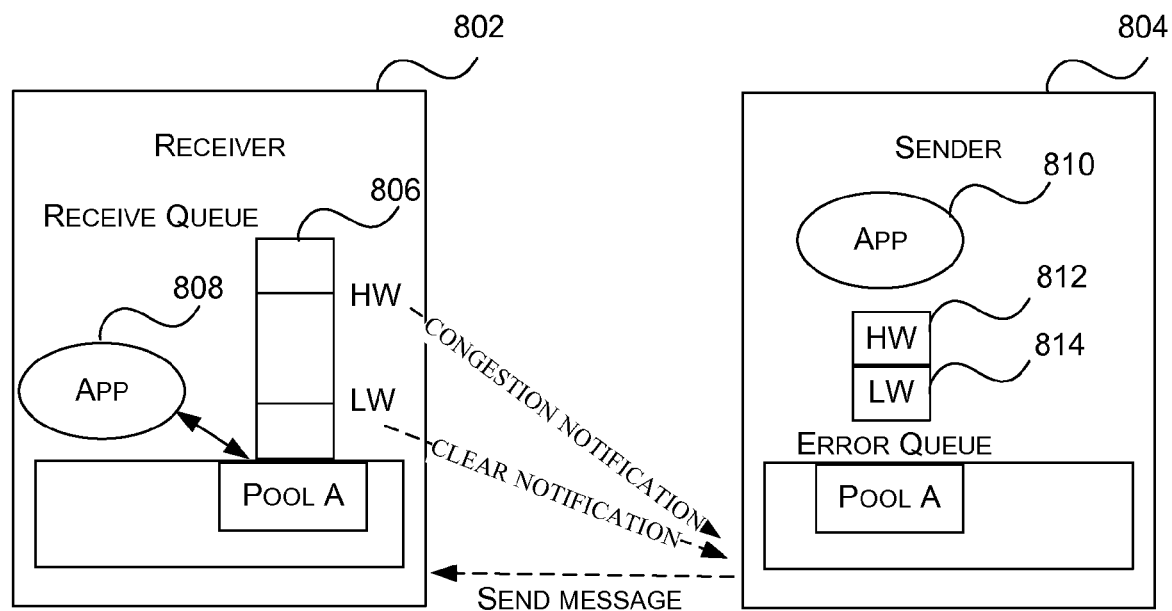
FIG. 8 is a block diagram illustrating exemplary techniques for providing back pressure notification from the receiver of packets to the sender of the packets.

FIG. 8 is a block diagram illustrating exemplary techniques for providing back pressure notification for congestion control from the receiver of packets to the sender of the packets. In FIG. 8, blocks 802 and 804 may be cards with processing entities performing embodiments of the invention. Block 804 may represent a management card or a linecard of FIG. 4, acting as a sender of packets and block 802 may represent a management card or a linecard, acting as a receiver of packets. The processing entities at blocks 804 and 802 may be running instantiations of the same application (810 and 808 respectively). The receiver 802, executing an instantiation of MI, may also maintain a receiving queue with a high water (HW) mark and a low water (LW) mark. As the sender continues to send packets, the receiving queue starts filling up. The application 808 running at the receiver 802 consumes the messages and releases the messages from the receive queue 806. However, in some instances, the application 808 may not be able to consume messages at the same rate at which they may arrive at the receiver 802. In such instances, the receiving queue 806 may start filling up. If the receiving queue fills beyond the high water mark, an instantiation of MI running at receiver 802 may send a congestion notification to the sender 804.

In response to receiving the congestion notification, an instantiation of the MI at the sender 804 may log an error for the high water (HW) mark 812 and notify the application 810 that a congestion situation is in progress at the receiver 802. The application 810 may respond to the notification by slowing down or stopping its packet transmission to the receiver 802 for the application associated with Pool A on the receiver 802. As the congestion clears out and the application 808 consumes the messages from the receiving queue 806 at the receiver 802, the receiving queue 806 may start emptying out. When the receiving queue 806 is below the low water mark, the receiver may send out a clear notification to the sender 804, indicating that the sender 804 may resume sending packets (at a faster pace). The low water (LW) mark bit 814 may be set at the receiver. In response, the application 810 at the sender may restart or fasten the transmission of packets. This congestion management by back pressure notifications may be advantageous in making efficient use of the bandwidth without filling the transmission channel with packets that cannot be accepted by the receiving entity.

Figure 9:
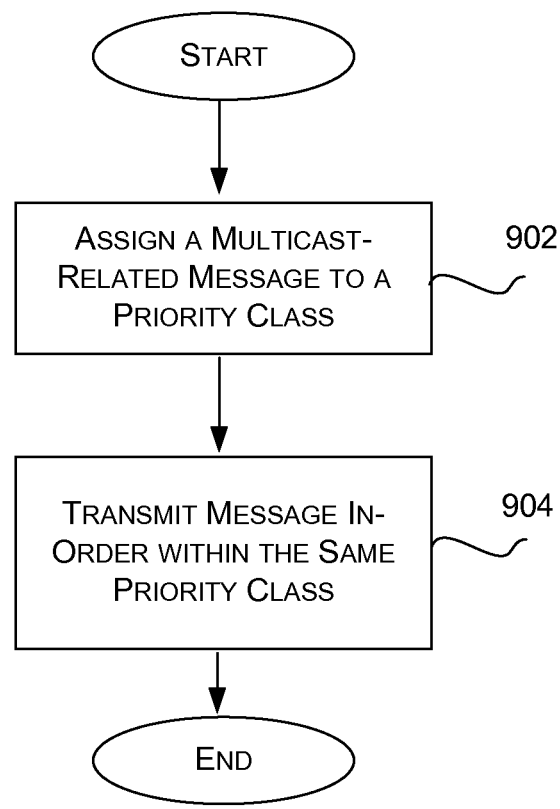
FIG. 9 is a flow diagram illustrating a method for prioritization of packets.

FIG. 9 is a flow diagram illustrating a method for prioritization of messages. According to one or more aspects, any and/or all of the methods and/or method steps described herein may be implemented by components of the network device 100 described in FIG. 1. In other implementations, the method may be performed by components of the network device described in FIG. 4, FIG. 15A and FIG. 15B. In one embodiment, one or more of the method steps described below with respect to FIG. 9 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

The MI protocol, described herein for performing embodiments of the invention, may also allow for multiple priority levels for messages. In one implementation, eight different priority levels may be allowed. At Step 902, the message is assigned to a priority class by the sender. A message may be assigned to a priority class based on the type of data and the application the data belongs to. For instance, real-time messages supporting video or voice may require higher priority and lower reliability. Reliability for a message may be maintained by using acknowledgment responses (ACKs) protocols for messages sent. Messages requiring ACKs may be more reliable since the messages are retransmitted by the sender if the message ACK is not received. Video and voice messages may not be able to tolerate delays, but can tolerate an appreciable level of packet loss.

At Step 904, the message is transmitted in order within the same priority class. For example, in-order transmission of a message, at a given priority class may mean that packets transmitted by different applications using the same priority may be transmitted on a first-come-first serve basis. For instance, a first or oldest packet at a given priority queue is transmitted first and the second or second oldest packet is transmitted second. In some implementations, instantiation of MI executing on the processing entities may maintain a send message queue for each priority. When a time slot for transmitting is available, the oldest message in the highest priority queues may be transmitted. In one implementation, the queues may be implemented using first-in first-out techniques.

MI protocol, as described herein for performing embodiments of the invention, may implement further optimizations for buffering a message before transmitting the message. In one implementation, a request for a delayed send may be specified in the send message API call, as shown in FIG. 14B. Messages are stored temporarily in a memory buffer of a predetermined size, until the buffer is either full, a timer for flushing the buffer expires or an explicit command for flushing the buffer such as a delayed flush request is received. This may be advantageous in reducing congestion on the communication plane between the processing entities and sending messages as burst transactions.

Figure 10:
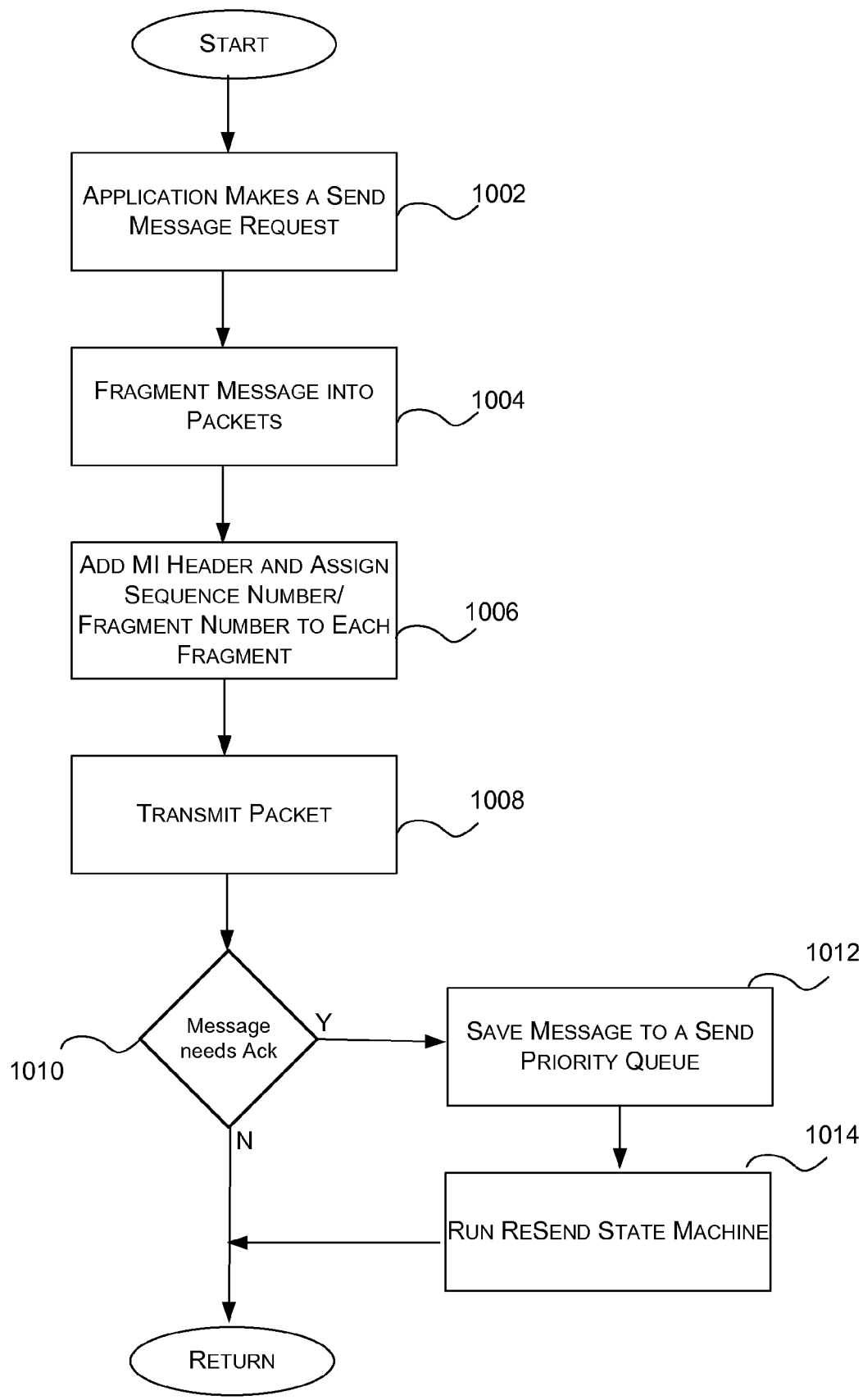
FIG. 10 is a flow diagram illustrating an exemplary embodiment of the invention for sending a packet.

FIG. 10 is a flow diagram illustrating an exemplary embodiment of the invention for sending a packet. According to one or more aspects, any and/or all of the methods and/or method steps described herein may be implemented by components of the network device 100 described in FIG. 1. In other implementations, the method may be performed by components of the network device described in FIG. 4, FIG. 15A and FIG. 15B. In one embodiment, one or more of the method steps described below with respect to FIG. 10 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At Step 1002, an application executing at one of the processing entities may initiate a request to send a message. In one implementation, the request is made using an application programming interface (API). Prior to making the request to send the message, if a socket for communication for the application does not already exist, the application may first open a socket for sending the message. FIG. 14A illustrates an exemplary API for opening a socket. At the time of opening a socket, the socket may be associated with a pool name. The pool name is used by MI to differentiate between multiple sockets. Opening a socket may be accomplished using creating and binding network socket operations provided by the operating system and well-known in the art. Additional parameters may be specified while opening a socket that are then associated with the pool name, such as acknowledgment requirements for transmitted messages associated with the pool name.

Once a socket is opened, the application may make the request to send a message using the "send message" request. FIG. 14B illustrates an exemplary API for sending a message using embodiments of the invention. The send message request may include the pool name associated with the send request, the destination information identifying the destination, a pointer to the payload and any additional parameters.

At Step 1004, the embodiments of the invention may fragment the message into multiple fragments based on the maximum transmission unit (MTU). For example, if the size of the message is 5 KB and the MTU is 1.5 KB, the message may be split into 4 packets, with the last packet containing only 0.5 KBs. At Step 1006, as shown in FIG. 3, each packet is assigned a sequence number 312 and fragment number 310. The sequence number 312 identifies the message for purposes of flow control, acknowledgements and in-order delivery. For example, in an acknowledgement protocol, the receiver may send back an acknowledgement message for the received message, by associating the acknowledgement message to the received message using the sequence number 312 from the received message. The fragment number 310 may be used by the receiver to reassemble the messages in the order they were fragmented into packets. In addition, the last fragment of a message may also have the "end fragment" flag set to indicate to the receiver that the message is the last fragment in the series of fragments for the message. The fragment of the message may be encapsulated with additional header information, as shown in FIG. 3, to generate a packet for transmission.

At Step 1008, components of the invention, such as one of the processing entities, may transmit the message to one or more destination processing entities. In one implementation the message is sent over an Ethernet backplane.

Figure 11:
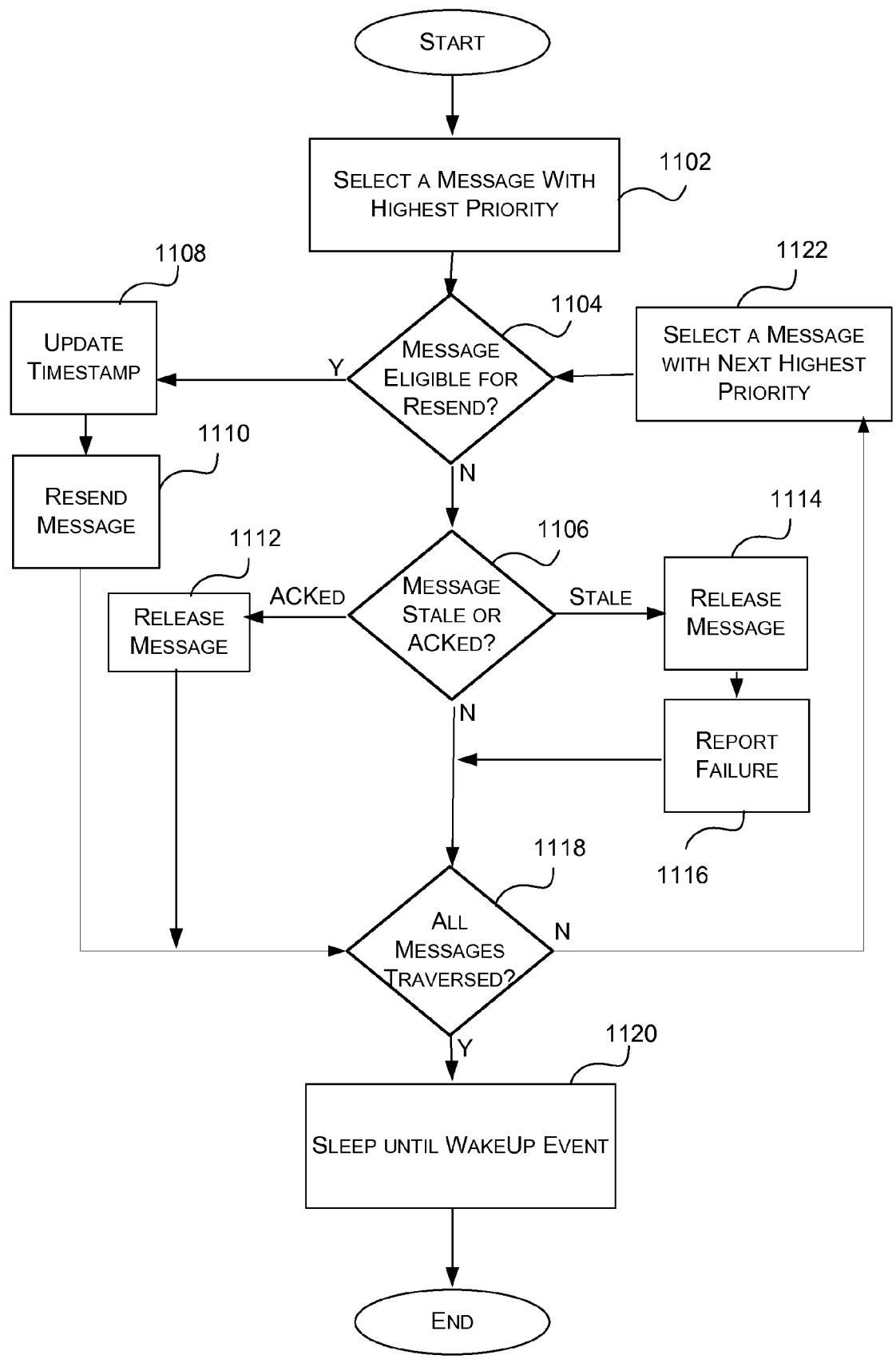
FIG. 11 is a flow diagram, illustrating one implementation for maintaining resend message queues.

At Step 1010, if the message is associated with a pool that does not require an acknowledgement (as indicated in Step 1002), the send message routine is completed. However, if the message is associated with a pool that requires an acknowledgment for the transmitted message, at Step 1012, the message is saved in a resend queue until an acknowledgement is received. At Step 1014, embodiments of the invention may perform the resend state machine to query any messages in the priority queues that may need to be retransmitted. FIG. 11 further elaborates Steps 1012 and 1014.

FIG. 11 is a flow diagram, illustrating one implementation for maintaining resend message queues. According to one or more aspects, any and/or all of the methods and/or method steps described herein may be implemented by components of the network device 100 described in FIG. 1. In other implementations, the method may be performed by components of the network device described in FIG. 4, FIG. 15A and FIG. 15B. In one embodiment, one or more of the method steps described below with respect to FIG. 11 are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

Messages are saved in the message queues when an ACK message is expected for a message by the sending entity from the receiving entity. In one implementation, as shown in FIG. 14A, the ACK requirement for the messages associated with a pool name may be specified at the time of opening a socket.

In one implementation, several priority levels may be supported for transmitting and receiving messages, as described in FIG. 9. Messages eligible for transmission from the higher priority queues may be transmitted prior to transmission of messages from lower priority queues. A separate message queue may be maintained for each priority level. The messages within each message queue may also be prioritized based on a number of factors, including time of last transmission.

At Step 1102, the sending entity selects a message with the highest priority from the message queues. At Step 1104, the sending entity checks if the message is eligible for resending. Eligibility for resending a message may be based on a number of factors, such as age of the message, number of times the message has been resent and ACK status of the message for each destination for the message. If the message is eligible for resending, at Step 1108, the timestamp for the message is updated and the message is resent to the destination (Step 1110). In one implementation, the message is resent using the flow described in FIG. 10.

After resending the message, the sending entity checks if all the messages in the queues have been traversed (Step 1118). If all the messages have not been traversed, then at Step 1122, the sending entity selects the next highest priority message and repeats the process of checking the eligibility of the message at Step 1104. On the other hand, if all messages in the priority resend queues have been traversed, the resend state machine may go into sleep or wait for the next wake up event (Step 1120). In one implementation a wake up event may be a new message that is queued.

If the message is not eligible for resending, then, at Step 1106, the sending entity may check if the message is already ACKed or Stale. At Step 1112, the message may be released if it is ACKed for all the destinations the message is marked/destined for. For instance, if the queued message was destined for three different destinations, the message queue may monitor ACK from all three destinations before releasing the message. At Step 1118, once the message is released, the sending entity may check if any additional messages need to be traversed.

On the other hand, if the message is stale, the message may be released (Step 1114) and an error may be reported (Step 1116). A message in the message queue may be considered stale if the message has been sent to the destination without a successful ACK for a predetermined number of times. The error message may be used in determining remedial steps by the application. At Step 1118, once the message is released and the error is reported, the sending entity may check if any additional messages need to be traversed.

Figure 12A:
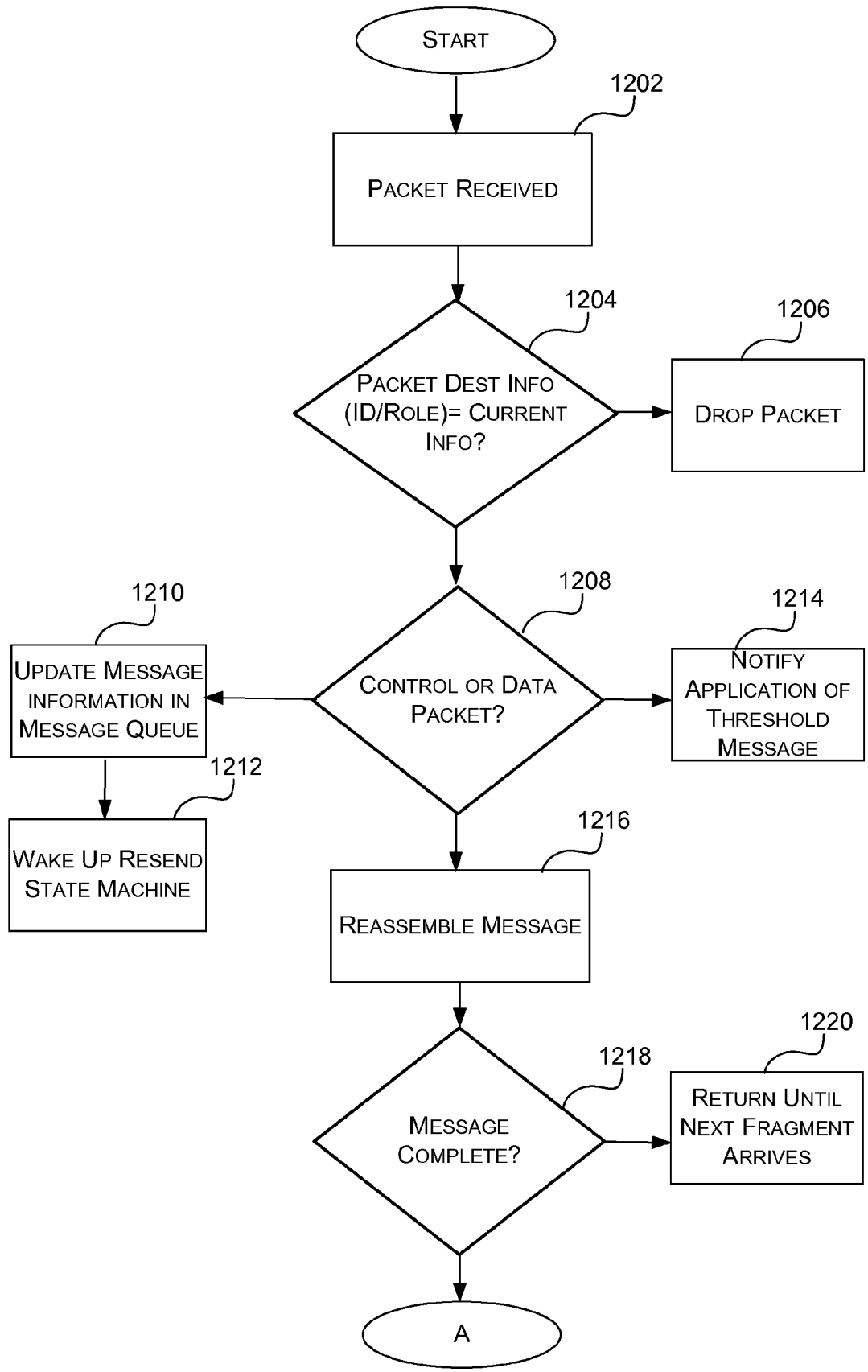
FIG. 12A and FIG. 12B illustrate a flow diagram for receiving fragments of a message according to one or more embodiments of the invention.
Figure 12B:
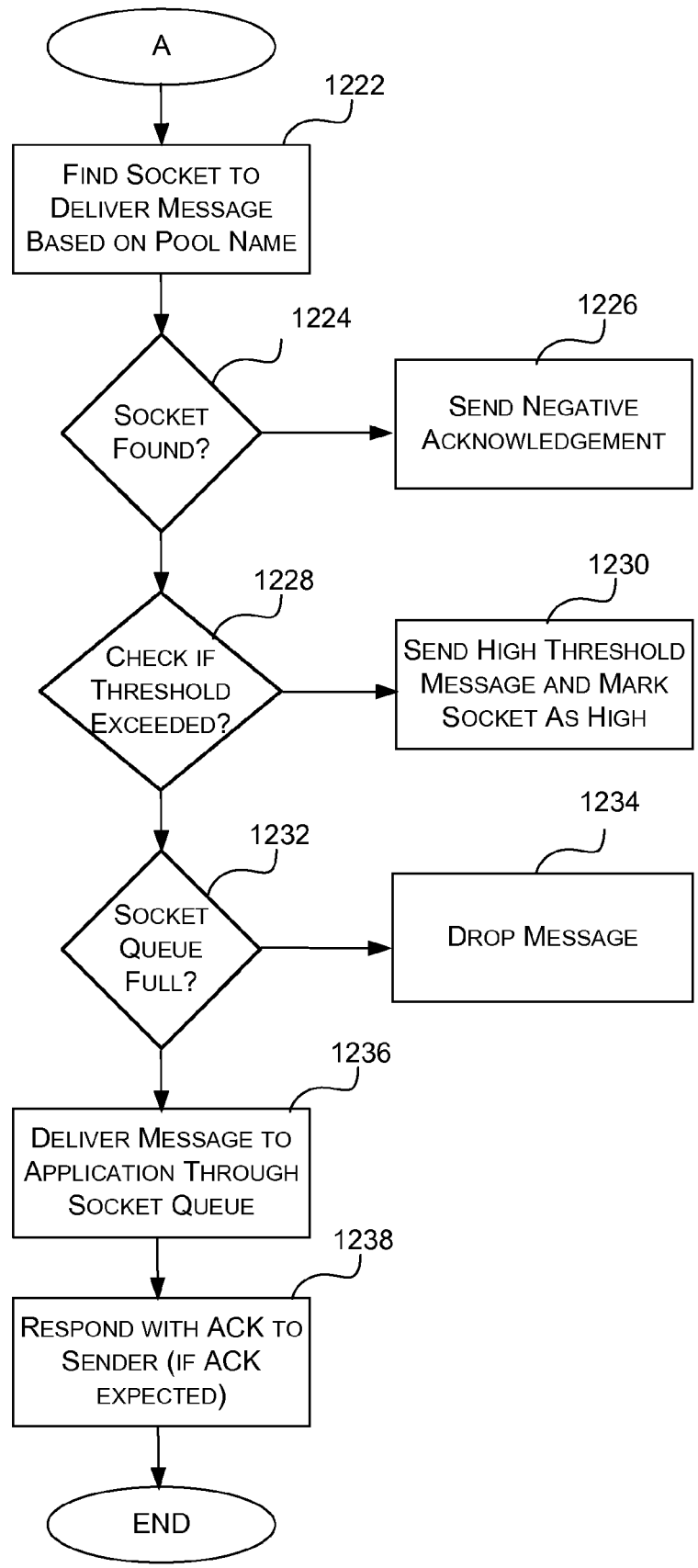

FIG. 12A and FIG. 12B illustrate a flow diagram for receiving fragments of a message according to one or more embodiments of the invention. According to one or more aspects, any and/or all of the methods and/or method steps described herein may be implemented by components of the network device 100 described in FIG. 1. In other implementations, the method may be performed by components of the network device described in FIG. 4, FIG. 15A and FIG. 15B. In one embodiment, one or more of the method steps described below with respect to FIG. 12A and FIG. 12B are implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At Step 1202, the processing entity at the receiving end receives a packet. The packet may comprise a complete message or may be a fragment of the full message. At Step 1204, the receiver may compare the destination information that may include the destination identifier (ID) 306 and the role identification information 308 against the destination information of the receiver. If the destination information does not match, the processing entity at the receiver may drop/discard the packet (Step 1206).

In an exemplary embodiment, two linecards may be associated with a single slot. The first linecard may operate in an active role, whereas the second linecard may operate in a standby mode. The destination identifier may correspond to the slot number so the destination identifier for both linecards may match the destination identifier in a received packet for either of the linecards. The role identification information may additionally indicate whether the packet is for the processing entity in the active role or the processing entity in the standby role. If the role identification information also matches the current role of the processing entity, the packet for the message is accepted and further processed. Otherwise, the packet may be dropped or discarded.

At Step 1208, the receiver determines if the packet is a control packet or a data packet. Control packets may include a complete message and the processing entity at the receiver may not expect any more fragments associated with the message. A control packet may be an ACK message or a Threshold notification. If the packet is an ACK message, then at 1210, the receiver may update the message queues, using the sequence number from the ACK message. At Step 1212, if the message in the message queue receives ACKs from all the destinations that the message was delivered to, then the resend state machine, from FIG. 11, may be invoked. At Step 1214, if the control message is a Threshold message the message is delivered to the application. If the Threshold message is a High Threshold or Congestion notification message the application may slow down or stop sending new messages until the application receives Low Threshold or clear notification messages indicating that the congestion has at least partially been resolved.

If the packet is a data packet, then at Step 1216, the message is reassembled using the received packet. The sequence number 312 and the fragment number 310 may be used in reassembling the message. The sequence number 312 identifies the message that the packet belongs to and the fragment number 310 helps determine the sequence in which the fragment may be assembled together. The last fragment in the sequence of fragments may have a flag indicating that it is the last fragment of the plurality of fragments to reassemble the message associated with the sequence number. At Step 1218, the receiver may determine based on the fragment flag if the packet was the last fragment of the plurality of fragments and if the message is complete. If the message is not complete, then at Step 1220, the routine will return until the next fragment in the sequence arrives. If the message is complete, then at Step 1222, the receiver finds the pool associated with the application, using the pool name from the packet header. At Step 1224, if the pool is not found, then the receiver sends a negative acknowledgment (or NACK) to the sender (Step 1226). If the pool is found, the receiver checks if the threshold for the receiving queue is exceeded, at Step 1228, and sends a High Threshold message or a Congestion notification message to the sender to either slow or stop sending more messages until resources are freed up (Step 1230). At Step 1232, the receiver checks if the pool queue is full. If the pool queue is full, at Step 1234, the message is dropped or discarded. If the queue is not full, the message is delivered to the application through the pool queue at Step 1236. At 1238, the receiver responds to the sender with an ACK message if the sender expects an ACK response. In one implementation, the expectation of an ACK response may be included in the packet or message header.

It should be appreciated that the specific steps illustrated in FIG. 12A and FIG. 12B provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination therebetween. Moreover, the individual steps illustrated in FIG. 12A and FIG. 12B may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 13:
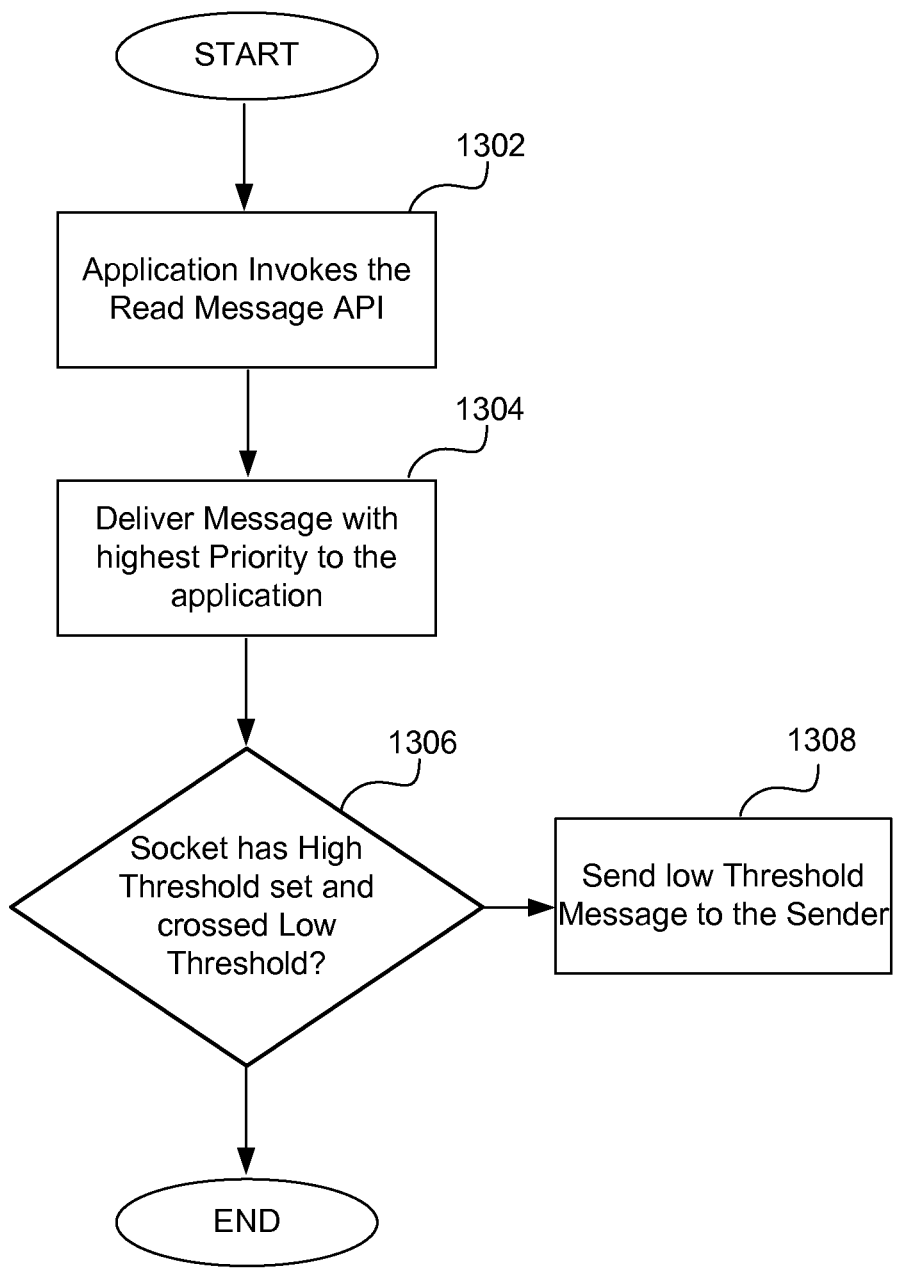
FIG. 13 is a flow diagram illustrating one implementation for receiving messages at the application.

FIG. 13 is a flow diagram illustrating one implementation for receiving messages at the application. According to one or more aspects, any and/or all of the methods and/or method steps described herein may be implemented by components of the network device 100 described in FIG. 1. In other implementations, the method may be performed by components of the network device described in FIG. 4, FIG. 15A and FIG. 15B. In one embodiment, one or more of the method steps described below with respect to FIG. 13 is implemented by one or more processing entities of the network device. Additionally or alternatively, any and/or all of the methods and/or method steps described herein may be implemented in computer-readable instructions, such as computer-readable instructions stored on a computer-readable medium such as the memory, storage or another computer readable medium.

At Step 1302, the application executing on the processing entity may invoke the Read Message API. At Step 1304, the Read Message API may deliver the message with the highest priority to the application. If the read is a blocking read, the Read Message call may not return until the message is received or the Read Message API times out. If it is determined, at Step 1306 that the pool buffer has a High Threshold set and has crossed below the Low Threshold, a Clear Notification Message (or Low Threshold message) may be sent to the sender (Step 1308).

FIG. 14A and FIG. 14B are an exemplary Application Programming Interface (API) call routine for performing embodiments of the invention. Prior to making the request to send the message, if a socket for communication for the application does not already exist, the application may first open a socket for sending the message. FIG. 14A illustrates an open socket API call. The API may take as parameters, the pool_name and open_parameters and may return the mi_socket for sending messages. The pool_name is used by MI to differentiate between multiple sockets. The open_parameters may include, but are not limited to ACKed and Delayed send timeout and buffer size. Setting the ACKed parameter may require the sending entity to queue the message associated with the pool, until an ACK is received from the receiving entity of the message. FIG. 11 discusses the resend protocol that manages the resend message queues. The delayed send timeout and buffer size may manage buffering of data associated with the pool. For instance, messages may be buffered until either the buffer size is reached or the timer times out according to the timeout value set in the parameters. Opening a socket may generally refer to creating an association between the application, file descriptor for the socket and a name tag for the socket. Opening a socket may be accomplished using creating and binding network socket operations well-known in the art.

Once a socket is opened, the application may make the request to send a message using the "send message" request. FIG. 14B illustrates an exemplary API for sending a message using embodiments of the invention. The send message request may include the pool name associated with the send request, the destination information identifying the destination, a pointer to the payload and any additional parameters. The additional parameters may include priority of the message within the priority queues. For instance, a real-time application use of a message, such as a voice or video message may be sent with higher priority than data for an FTP transfer of data. The delayed send parameter may indicate that the message may be delayed and sent with other messages using the delay buffer. The delayed flush parameter may explicitly flush out all the contents of the delay buffer.

Figure 15A:
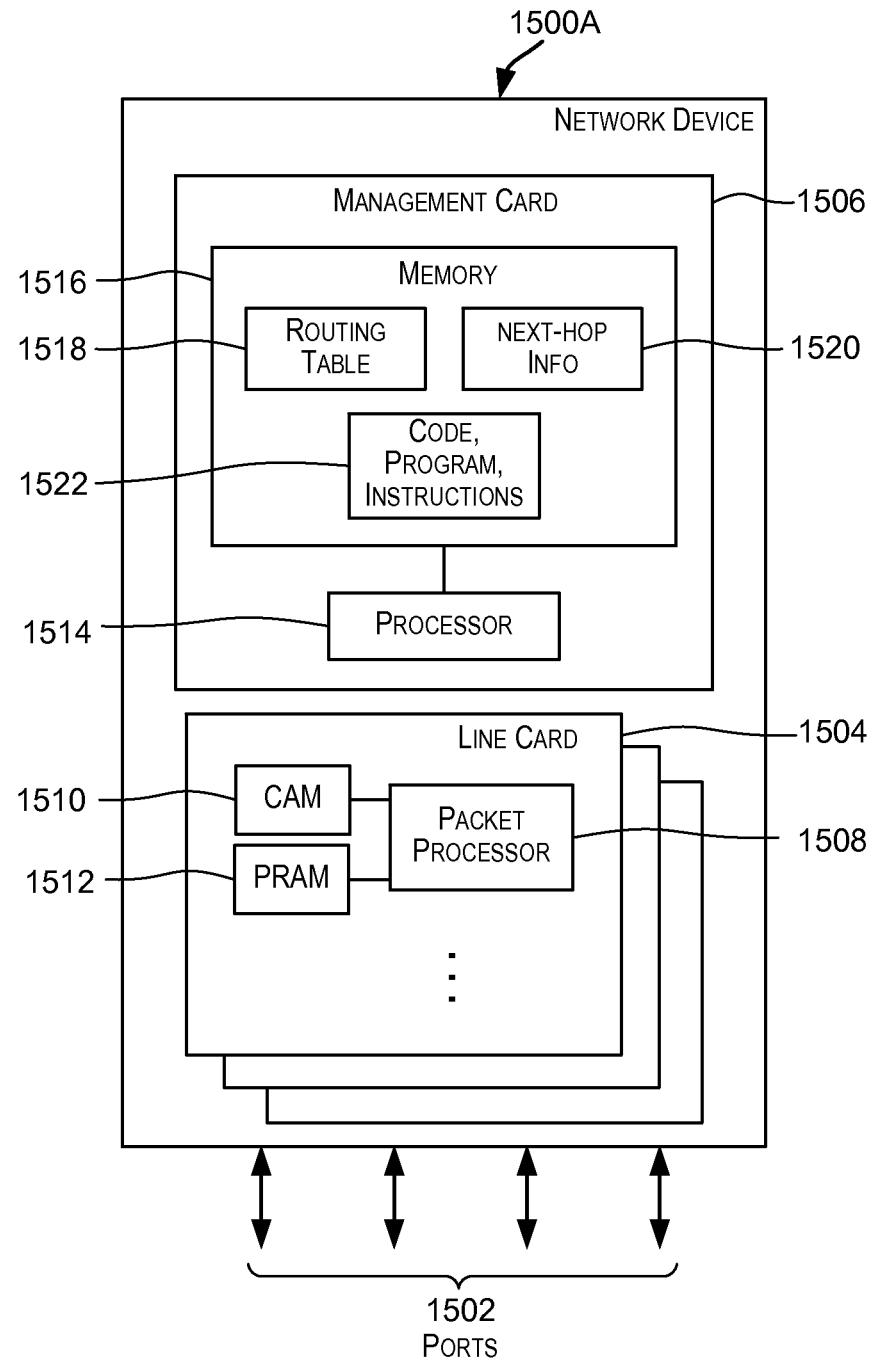
FIG. 15A and FIG. 15B depict simplified block diagrams of a network device for performing embodiments of the present invention.

FIG. 15A depicts a simplified block diagram of a network device 1500A that may be configured to perform embodiments of the present invention. The Network device 1500A illustrates only one management card and linecard for illustrating purposes, but may be extended to provide multiple management cards and linecards as shown in FIGS. 1, 2, and 4. Network device 1500A may be a router or switch that is configured to forward data such as a router or switch provided by Brocade Communications Systems, Inc. In the embodiment depicted in FIG. 15A, network device 1500A comprises a plurality of ports 1502 for receiving and forwarding data packets and multiple cards that are configured to perform processing to facilitate forwarding of the data packets. The multiple cards may include one or more linecards 1504 and one or more management cards 1506. A card, sometimes also referred to as a blade or module, can be inserted into the chassis of network device 1500A. This modular design allows for flexible configurations with different combinations of cards in the various slots of the device according to differing network topologies and switching requirements. The components of network device 1500A depicted in FIG. 15A are meant for illustrative purposes only and are not intended to limit the scope of the invention in any manner. Alternative embodiments may have more or fewer components than those shown in FIG. 15A.

Ports 1502 represent the I/O plane for network device 1500A. Network device 1500A is configured to receive and forward data using ports 1502. A port within ports 1502 may be classified as an input port or an output port depending upon whether network device 1500A receives or transmits a data packet using the port. A port over which a data packet is received by network device 1500A is referred to as an input port. A port used for communicating or forwarding a data packet from network device 1500A is referred to as an output port. A particular port may function both as an input port and an output port. A port may be connected by a link or interface to a neighboring network device or network. Ports 1502 may be capable of receiving and/or transmitting different types of data traffic at different speeds including 1 Gigabit/sec, 10 Gigabits/sec, or more. In some embodiments, multiple ports of network device 1500A may be logically grouped into one or more trunks.

Upon receiving a data packet via an input port, network device 1500A is configured to determine an output port for the packet for transmitting the data packet from the network device to another neighboring network device or network. Within network device 1500A, the packet is forwarded from the input network device to the determined output port and transmitted from network device 1500A using the output port. In one embodiment, forwarding of packets from an input port to an output port is performed by one or more linecards 1504. Linecards 1504 represent the data forwarding plane of network device 1500A. Each linecard 1504 may comprise one or more packet processing entities 1508 that are programmed to perform forwarding of data packets from an input port to an output port. A packet processing entity on a linecard may also be referred to as a line processing entity. Each packet processing entity 1508 may have associated memories to facilitate the packet forwarding process. In one embodiment, as depicted in FIG. 15A, each packet processing entity 1508 may have an associated content addressable memory (CAM) 1510 and a RAM 1512 for storing forwarding parameters (RAM 1512 may accordingly also be referred to as a parameter RAM or PRAM). In one embodiment, for a packet received via an input port, the packet is provided to a packet processing entity 1508 of a linecard 1504 coupled to the input port. The packet processing entity receiving the packet is configured to determine an output port of network device 1500A to which the packet is to be forwarded based upon information extracted from the packet. The extracted information may include, for example, the header of the received packet. In one embodiment, a packet processing entity 1508 is configured to perform a lookup in its associated CAM 1510 using the extracted information. A matching CAM entry then provides a pointer to a location in the associated PRAM 1512 that stores information identifying how the packet is to be forwarded within network device 1500A. Packet processing entity 1508 then facilitates forwarding of the packet from the input port to the determined output port.

Since processing performed by a packet processing entity 1508 needs to be performed at a high packet rate in a deterministic manner, packet processing entity 1508 is generally a dedicated hardware device configured to perform the processing. In one embodiment, packet processing entity 1508 is a programmable logic device such as a field programmable gate array (FPGA). Packet processing entity 1508 may also be an ASIC.

Management card 1506 is configured to perform management and control functions for network device 1500A and thus represents the management plane for network device 1500A. In one embodiment, management card 1506 is communicatively coupled to linecards 1504 and includes software and hardware for controlling various operations performed by the linecards. In one embodiment, a single management card 1506 may be used for all the linecards 1504 in network device 1500A. In alternative embodiments, more than one management card may be used, with each management card controlling one or more linecards.

A management card 1506 may comprise a processing entity 1514 (also referred to as a management processing entity) that is configured to perform functions performed by management card 1506 and associated memory 1516. As depicted in FIG. 15A, the routing table 1518 and associated next-hop and RI information may be stored in memory 1516. The next-hop and RI information may be stored and used in an optimized manner as described above. Memory 1516 is also configured to store various programs/code/instructions 1522 and data constructs that are used for processing performed by processing entity 1514 of management card 1506. For example, programs/code/instructions, which when executed by processing entity 1514 cause the next-hop information to be stored in an optimized manner may be stored in memory 1516. In one embodiment, processing entity 1514 is a general purpose microprocessor such as a PowerPC, Intel, AMD, or ARM microprocessor, operating under the control of software 1522 stored in associated memory 1516.

In one embodiment, the functions performed by management card processing entity 1514 include maintaining a routing table, creating associations between routes in the routing table and next-hop information, updating the routing table and associated next-hop information responsive to changes in the network environment, and other functions. In one embodiment, management processing entity 1514 is configured to program the packet processing entities and associated memories of linecards 1504 based upon the routing table and associated next-hop information. Programming the packet processing entities and their associated memories enables the packet processing entities to perform data packet forwarding in hardware. As part of programming a linecard packet processing entity and its associated memories, management processing entity 1514 is configured to download routes and associated next-hops information to the linecard and program the packet processing entity and associated memories. Updates to the next-hop information are also downloaded to the linecards to enable the packet processing entities on the linecards to forward packets using the updated information.

Figure 15B:
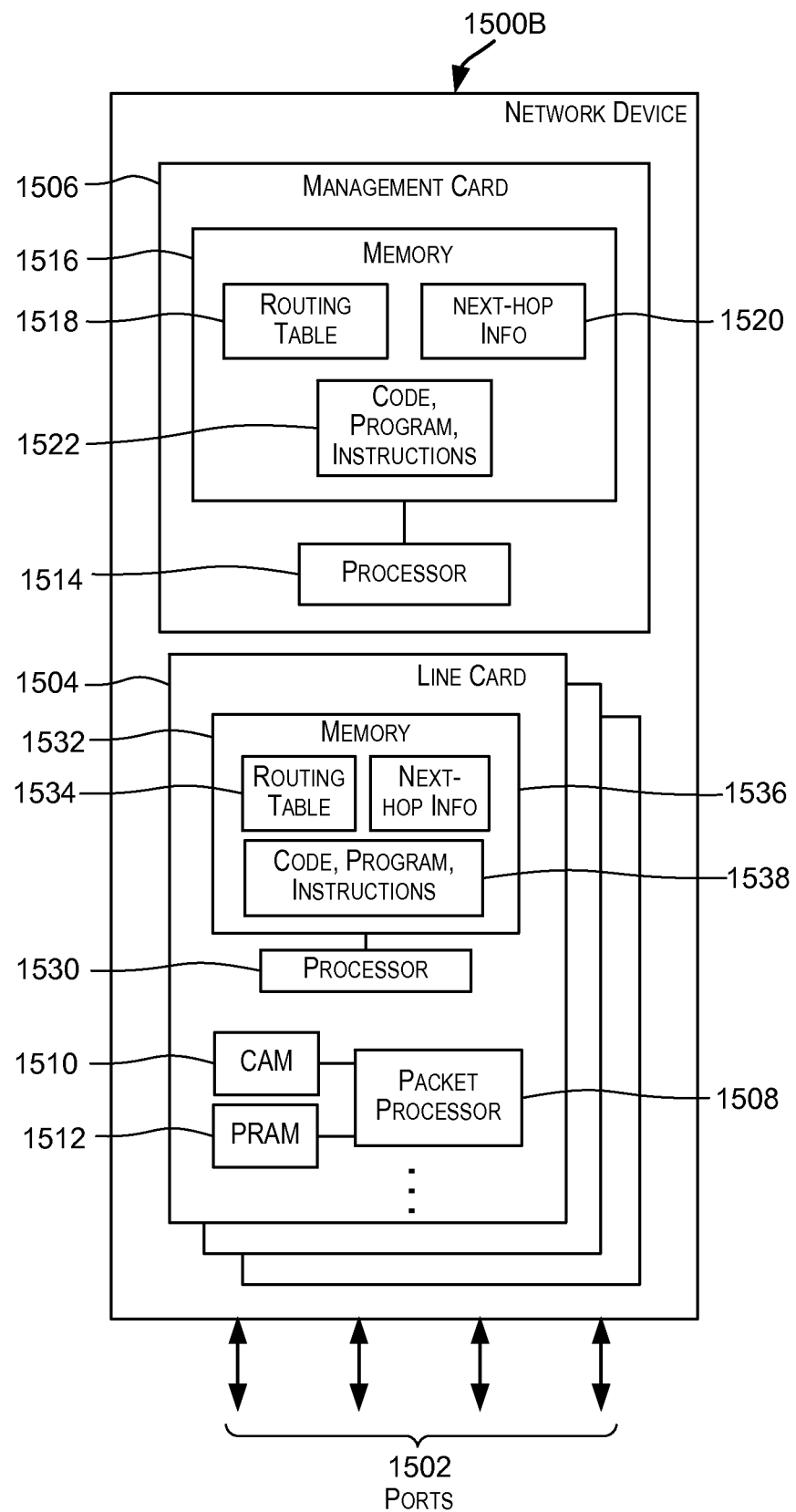

FIG. 15B depicts another example of a network device 1500B that may incorporate an embodiment of the present invention. Network device 1500B is similar to network device 1500A depicted in FIG. 15A and described above except that linecard 1504 additionally comprises a processing entity 1530 and associated memory 1532. Processing entity 1530 may be a CPU similar to management processing entity 1514. In this embodiment, linecard memory 1532 may store routing table 1534 and associated next-hop information 1536. Processing entity 1530 uses the routing and next-hop information stored in memory 1532 to program the packet processing entities and their associated memories on the linecard. In one embodiment, routing table 1534 and associated next-hop information 1536 is kept synchronized with routing table 1518 and next-hop information 1520 stored by management card 1506. Management card 1506 is configured to download the routing and associated next-hop information stored in its memory 1516 to a linecard 1504. The routing and next-hop information downloaded to a linecard 1504 from the management card is then stored in memory 1532 of the linecard and used to program packet processing entities 1508 and their associated memories. When changes are made to the routing table and associated next-hop information stored in management card 1506, the changes are downloaded to the linecard so that the routing and next-hop information stored in memory 1532 of the linecard can be updated to reflect the changes.

As described above, for both network device embodiments depicted in FIGS. 15A and 15B, routing table and associated next-hop information is downloaded from a management card to a linecard. In the embodiment depicted in FIG. 15A the information may be downloaded as part of the management processing entity programming the packet processing entities and associated memories on the linecard. For the embodiment depicted in FIG. 15B, the information may be downloaded and stored in memory 1532 on the linecard. Processor 1530 on the linecard may then use the stored information to program the packet processing entities and their associated memories. In one embodiment, the whole routing table and associated next-hop information is downloaded to the linecard from the management card. The use of sharable next-hops and sharable RIs, as described above, makes the process of updating the linecards fast and efficient. In the past, downloading routing table and associated next-hop information to a linecard from the management processing entity involved downloading to the linecard information identifying each of the routes in the routing table and, for each route, next-hop information for the route.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, these are not intended to limit the scope of inventive embodiments.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention.

What is claimed is:

1. A network device comprising:
    a plurality of ports for receiving and forwarding data traffic;
    a first processing entity and a second processing entity configurable to process the data traffic for forwarding;
    the first processing entity further configurable to transmit a packet comprising destination information, the destination information comprising a destination identifier and role identification information, the destination identifier identifying a set of one or more destinations, the role identification information identifying a role;
    the second processing entity further configurable to:
        receive the packet;
        determine, based upon the destination information of the packet, that the second processing entity is an intended recipient for the packet if the second processing entity is identified by the destination identifier and the second processing entity operates in a first role specified by role identification information; and
        transmit an acknowledgment packet to the first processing entity, upon determining that the second processing entity is the intended recipient; and
    the first processing entity further configurable to release resources associated with the packet after receiving the acknowledgement packet for the packet.

2. The network device of claim 1, further comprising
    a third processing entity configurable to:
        receive the packet; and
        determine, based upon the destination information of the packet, that the third processing entity is an intended recipient for the packet if the third processing entity is identified by the destination identifier and the third processing entity operates in a second role specified by role identification information.

3. The network device of claim 2, wherein
    the first role is an active role and the second processing entity is further configurable to perform a set of routing-related functions in the active role; and
    the second role is a standby role and the third processing entity is further configurable to not perform the functions of the active role in the standby role.

4. The network device of claim 1, wherein the first processing entity is further configurable to retransmit the packet upon receiving an error packet or an expiry of a timer threshold.

5. The network device of claim 1, further comprising
    a third processing entity configurable to switch to the first role from a second role, wherein the second processing entity is no longer available to operate in the first role, the third processing entity further configurable to:
        receive the packet; and
        determine, based upon the destination information of the packet, that the third processing entity is an intended recipient for the packet if the third processing entity is identified by the destination identifier and the third processing entity operates in the first role specified by the role identification information.

6. The network device of claim 1, wherein the packet is transmitted using an Ethernet protocol implemented in a networking stack executing on the first processing entity.

7. The network device of claim 1, wherein the packet is assigned a priority class from a plurality of priority classes.

8. The network device of claim 7, wherein the packet is delivered in the same order relative to other packets within the same priority class to the second processing entity that the packet is transmitted from the first processing entity.

9. The network device of claim 1, wherein the second processing entity is further configurable to:
    determine that a memory buffer assigned for the application for receiving the packet from the first processing entity is filled beyond a high threshold; and
    generate a congestion notification packet for the first processing entity, in response to determining that the memory buffer is filled beyond the high threshold.

10. The network device of claim 1, wherein the second processing entity is further configurable to:
    determine that a memory buffer assigned for an application for receiving packets from the first processing entity is cleared below a low threshold; and
    generate a clear notification packet for the first processing entity, in response to determining that the memory buffer is cleared below the low threshold.

11. A method comprising:
    generating, using a first processing entity, a packet comprising destination information, the destination information comprising a destination identifier and role identification information, the destination identifier identifying a set of one or more destinations, the role identification information identifying a role;
    transmitting the packet from the first processing entity to a second processing entity;
    determining, at the second processing entity, based upon the destination information of the packet, that the second processing entity is an intended recipient for the packet if the second processing entity is identified by the destination identifier and the second processing entity operates in a first role specified by the role identification information;
    transmitting, by the second processing entity, an acknowledgment packet to the first processing entity, upon determining that the second processing entity is the intended recipient; and
    releasing resources associated with the packet, by the first processing entity, after receiving the acknowledgement packet for the packet.

12. The method of claim 11, further comprising:
receiving, at a third processing entity, the packet; and
determining, by the third processing entity, based upon the destination information of the packet, that the third processing entity is an intended recipient for the packet if the third processing entity is identified by the destination identifier and the third processing entity operates in a second role specified by the role identification information.

13. The method of claim 12, wherein the first role is an active role, wherein the second processing entity performs the set of routing-related functions in the active role, and the second role is a standby role, wherein the third processing entity does not perform the functions of the active role in the standby role.

14. The method of claim 11 further comprises retransmitting the packet, by the first processing entity, upon receiving an error packet or an expiry of a timer threshold.

15. The method of claim 11, further comprising:
switching a third processing entity to operate in the first role from a second role, wherein the second processing entity is no longer available to operate in the first role;
receiving, at the third processing entity, the packet; and
determining, at the third processing entity, based upon the destination information of the packet, that the third processing entity is an intended recipient for the packet if the third processing entity is identified by the destination identifier and the third processing entity operates in the first role specified by the role identification information.

16. The method of claim 11, wherein the packet is assigned a priority class from a plurality of priority classes and wherein the packet is delivered, in the same order relative to other packets within the same priority class, to the second processing entity, that the packet is transmitted from the first processing entity.

* * * * *